(12) United States Patent
Scarborough

(10) Patent No.: US 7,510,201 B2
(45) Date of Patent: Mar. 31, 2009

(54) LEVER ENHANCED PEDALING SYSTEM

(75) Inventor: Rashad Na'im Scarborough, 405 Pilot St., A12, Durham, NC (US) 27707

(73) Assignee: Rashad Na'im Scarborough, Durham, NC (US)

( * ) Notice: Subject to any disclaimer, the term of this patent is extended or adjusted under 35 U.S.C. 154(b) by 135 days.

(21) Appl. No.: 11/260,003

(22) Filed: Oct. 27, 2005

(65) Prior Publication Data

US 2006/0066072 A1    Mar. 30, 2006

Related U.S. Application Data

(63) Continuation-in-part of application No. 10/825,369, filed on Apr. 16, 2004, now abandoned.

(51) Int. Cl.
*B62M 1/04* (2006.01)
*B62M 9/00* (2006.01)

(52) U.S. Cl. .................. 280/253; 280/255; 280/256

(58) Field of Classification Search ............... 280/253, 280/255, 256, 258
See application file for complete search history.

(56) References Cited

U.S. PATENT DOCUMENTS

| | | | | |
|---|---|---|---|---|
| 1,690,342 A * | 11/1928 | Madsen | ........................ | 280/257 |
| 2,184,244 A * | 12/1939 | Meyer | ........................ | 280/257 |
| 3,834,733 A * | 9/1974 | Harris | ........................ | 280/251 |
| 4,026,571 A * | 5/1977 | Vereyken | ........................ | 280/251 |
| 4,053,173 A * | 10/1977 | Chase, Sr. | ........................ | 280/253 |
| 4,549,874 A * | 10/1985 | Wen | ........................ | 474/69 |
| 4,561,318 A * | 12/1985 | Schirrmacher | ........................ | 74/54 |
| 4,666,173 A * | 5/1987 | Graham | ........................ | 280/255 |
| 4,666,174 A * | 5/1987 | Efros | ........................ | 280/258 |
| 4,857,035 A * | 8/1989 | Anderson | ........................ | 474/69 |
| 5,335,927 A * | 8/1994 | Islas | ........................ | 280/255 |
| 5,405,157 A * | 4/1995 | Bezerra et al. | ........................ | 280/253 |
| 5,716,069 A * | 2/1998 | Bezerra et al. | ........................ | 280/254 |
| 6,663,127 B2 * | 12/2003 | Miller | ........................ | 280/256 |
| 6,699,161 B1 * | 3/2004 | Speas | ........................ | 482/61 |
| 7,011,376 B2 * | 3/2006 | Sepulveda | ........................ | 301/2.5 |

FOREIGN PATENT DOCUMENTS

| | | | | |
|---|---|---|---|---|
| DE | 2831880 A | * | 2/1980 | |
| EP | 63895 A | * | 11/1982 | |
| EP | 311782 A | * | 4/1989 | |
| FR | 2465633 | * | 4/1981 | |

* cited by examiner

*Primary Examiner*—Lesley D. Morris
*Assistant Examiner*—Daniel Yeagley

(57) ABSTRACT

A bicycle free from the conditions of having any part of the bicycle in the area between its wheels or horizontally adjacent to that area, except its pedal member and frontal portions of levers. A bicycle with two lever propulsion (14 and 15) machines having two levers formed in an approximate "L" shape. The shorter side of the "L" would be closely vertical and longer side would be closely horizontal when either lever is rotated to its lowest position. The pedaling system can also reciprocate with use of a high strength chain 6, having ends connected to the mid-portion of its levers. This chain 6 can be pulled over at least one mounted sprocket 56, mounted to the frame 4. Each lever is suspended above the ground by their connection to a member pivotal arm 53 suspended within the frame 4. The bicycle further has a reverse mechanism 30 to enable the bicycle to move backwards.

9 Claims, 23 Drawing Sheets

SECTION AA

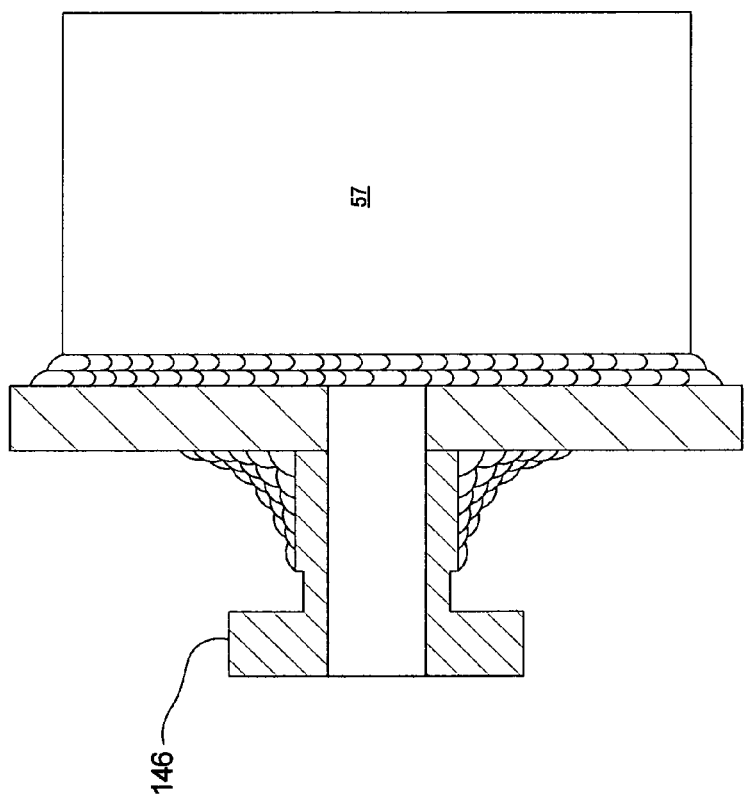

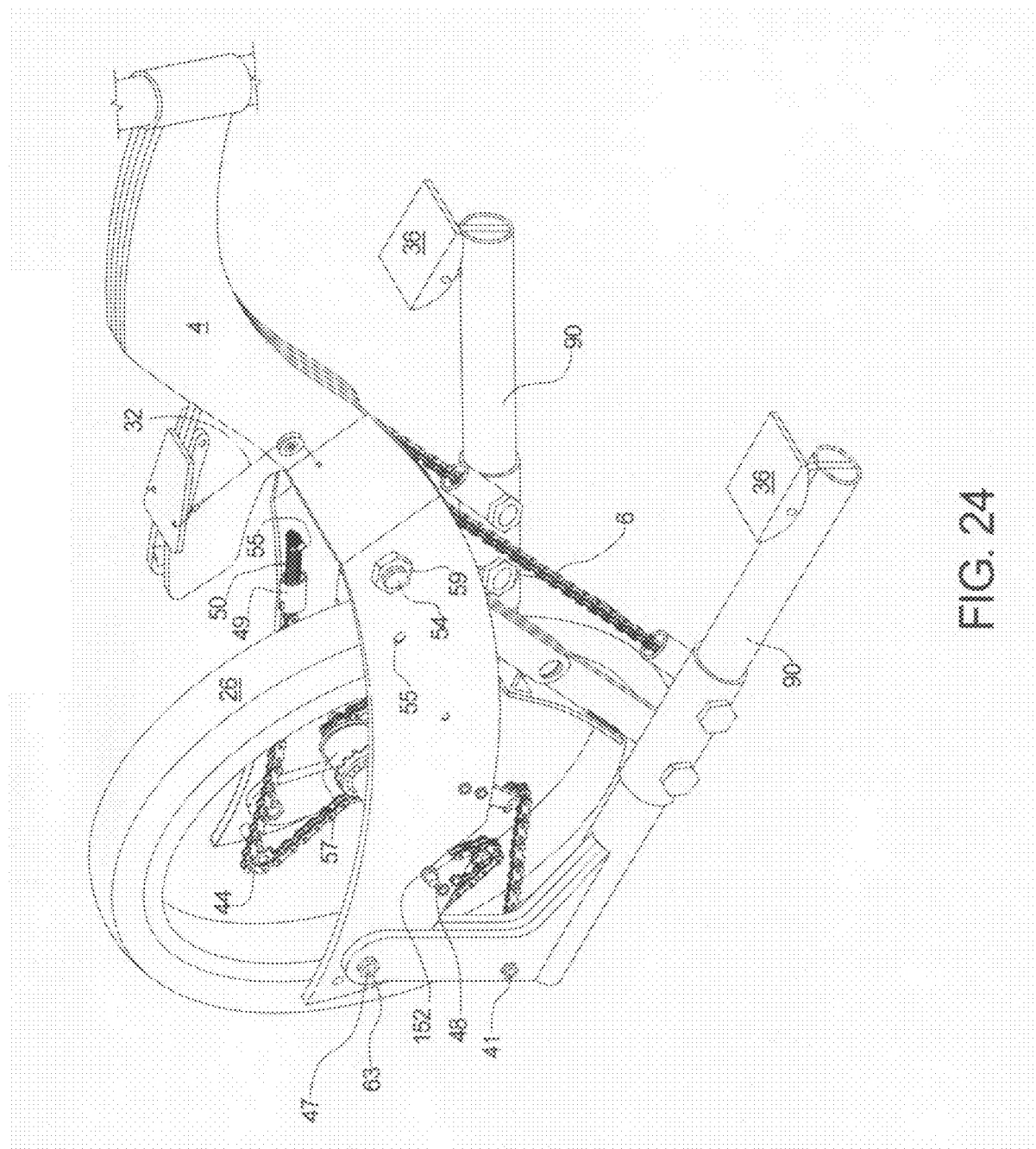

LEVER ENHANCED PEDALING SYSTEM

CROSS-REFERENCES TO RELATED APPLICATIONS

This application is a Continuation-In-Part application of Ser. No. 10/825,369, filed on Apr. 16, 2004, now abandoned.

BACKGROUND OF THE INVENTION

1. Field of the Invention

This invention relates to bicycles possessing a propulsion system composed of lever machines.

2. Description of the Related Art

In the bicycle industry there are a multitude of pedal propulsion systems that offer a wide variety of commuting benefits for the bicyclist. Notably, these are pedaling systems that provide multi-speed human powered propulsion that allows the rider to pedal with little effort up an incline and increase in speed efficiently.

Currently, the prevalent configuration of bicycles in the market place have a rotary pedaling system that utilizes two pedals, pivotally connected to a rigid assembly of two crank arms and a crank sprocket. Furthermore, these two crank arms mounted to a crank sprocket engage a transmission chain for engaging the rear sprocket of the rear wheel. These pedaling systems vary from multi-speed to single speed, but their mechanical nature restricts their frame design to century old principle structures; which is the need for a bicycle frame to suspend the crank shaft between the front and rear wheels. Furthermore, although these rotary systems utilize crank sprockets in the form of the wheel and axle machine, they cannot have more mechanical advantage than the lever machine, because the fulcrum or shaft of the crank arms is usually positioned close to the level of the axles belonging to the bicycles wheels providing transport. This level restricts the length of the crank arms which acts as levers on the wheel and axle because of its proximity to the ground. However, a lever machine usually amplifies the spreading of propulsion effort along a longer distance and has movements concentrated to pivotal swings instead of a one direction rotational path. Thus, being significantly free from the vertical restrictions of the ground and the riders' range of motion. Because, this effort to move a transport load is spread over a much longer distance using a lever arm than the crank arm, a rider pedaling with levers will have lesser effort pedaling a bicycle.

There have been a myriad of bicycle inventions exploiting the mechanical advantage of the lever machine. U.S. Pat. No. 4,666,173 to Graham (1987) discloses a bicycle having a lever configured pedaling system, with fulcrums positioned behind the rear wheel axle and lever arms extending between the bicycle's wheels providing transport. However, the illustrated lever arms cannot possibly provide sound pedaling efficiency as discovered by my observation of similar lever arms built and applied to a two wheeled vehicle frame. My experimentation with such levers having a pivotal pedal that extended out horizontally from the frontal outer wall of each lever yielded evidence of the right lever twisting clockwise when applying downward force on its pedal and the left lever twisting counter clockwise when applying downward force on its pedal. Looking at the shape of the levers as illustrated in the (U.S. Pat. No. 4,666,173) (FIG. 3), the levers 48 and 50 have the potential for twisting in a like manner, like the similar levers conducted in my experiment. The invention also utilizes an indirect transmission means from the lever to the sprocket of the rear wheel; however, the lever enhanced pedaling system (L.E.P.S.) uses a direct transmission means from its levers to the sprockets of the rear wheel. As illustrated in U.S. Pat. No. 4,666,173 the first transmission means from the lever is a shaft arm and ratchet for moving the pedal sprocket above the rear wheel in one direction. The second transmission means is a chain connected to the pedal sprocket to the rear wheel sprocket. The lever enhanced pedaling system (L.E.P.S.) skips over the extra weight of an indirect transmission means allowing designers using this system to produce a more aero dynamic, less bulky and more efficient bicycle.

Two inventions utilizing the advantages of the lever machine is U.S. Pat. No. 4,666,174 to Efros (1987) and U.S. Pat. No. 5,335,927 to Islas (1994). These inventions are composed of a bicycle having a lever configured pedaling system, with fulcrums positioned in front of the rear wheel axle providing lever ends with the ability to pivot below the bicycles mid-frame portion. These lever pedaling systems have lesser mechanical advantage than the lever enhanced pedaling system (L.E.P.S.), because their levers are shorter in length and thus the effort needed to propel the rider is spread out in a shorter distance from the applied force of the riders' foot to the fulcrum. The lever enhanced pedaling system has a principle configuration which allows the fulcrums to be behind the axle of the rear wheel while its levers are extended from that pivotal area to the area between the vehicle's two wheels. Thus, its lever machines are longer in length than the lever machines in U.S. Pat. Nos. 4,666,174 and 5,335,927 which give the lever enhance pedaling system a greater mechanical advantage.

As mentioned before, the current standard mechanical configuration of bicycles, which has been around since the 19th century, restricts their frame design to having a bicycle frame that suspends the crank shaft between the front and rear wheels. This frame design is usually triangular and tubular, like the U.S. Pat. No. 5,405,157 to Bezerra (1995). The fulcrum of the lever machines in this patent application is suspended by the frame of the bicycle between the front and rear wheels. U.S. Pat. No. 4,857,035 to Anderson (1989) also has a triangular tubular structure and besides it having a lesser mechanical advantage than the L.E.P.S., because its' lever is shorter in length; much of its complex mechanical configuration is exposed, allowing its mechanical components to diminish the beauty of the frames form. The mechanical configuration of the L.E.P.S. allows for a frame structure that conceals much of its' mechanical interactions between its' levers, transmission chains and rear wheel sprockets, thus adding more stream line appeal to the bicycle as well as marketability.

OBJECTS AND ADVANTAGES

Notably, besides the objects and advantages of the lever enhanced pedaling system described in my above patent, several objects and advantages of the present invention are:

(a) to provide a bicycle enabling its levers to efficiently reciprocate for quality pedaling propulsion and allowing them to be suspended above ground by the use of reliable pivotal steel beams fastened to a common shaft within the frame of the bicycle;

(b) to provide beam reinforced tubular levers that safely support the weight of a healthy bicyclist;

(c) to provide a lever enhanced propelled bicycle that is free from the triangular tube structured frames of conventional bicycles;

(d) to provide a lever pedaling bicycle offering less effort to propel the rider to longer distances per downward pedal;

Further objects and advantages are to provide an enhanced lever pedaling bicycle free from the suspension of a crank sprocket between its two wheels, thus allowing bicycle designers more room for creativity in frame design. Still further, advantages will become apparent from a consideration of the ensuing description and drawings.

BRIEF SUMMARY OF THE INVENTION

In accordance with the present invention the lever enhanced pedaling system for bicycles comprises a pedaling system enabling little effort needed to propel the vehicle and a vehicle with a principle configuration allowing the absence of an upright open through structure or tubular triangular frame, or any portion of the bicycles' frame in the area 150 between the vehicles two wheels or horizontally adjacent to that area 150.

BRIEF DESCRIPTION OF THE DRAWINGS

FIG. 8 illustrates a welded assembly of a small sprocket 146 with hub welded to a round disk which is then welded to a modified cylinder 57 which is then welded to the free style sprocket 34 fastened to the hub of the rear wheel.

FIG. 24 illustrates an isometric view of the complete assembly of the L.E.P.S. leaving out prior art or conventional components like the seat and handle bar.

Figure 1:
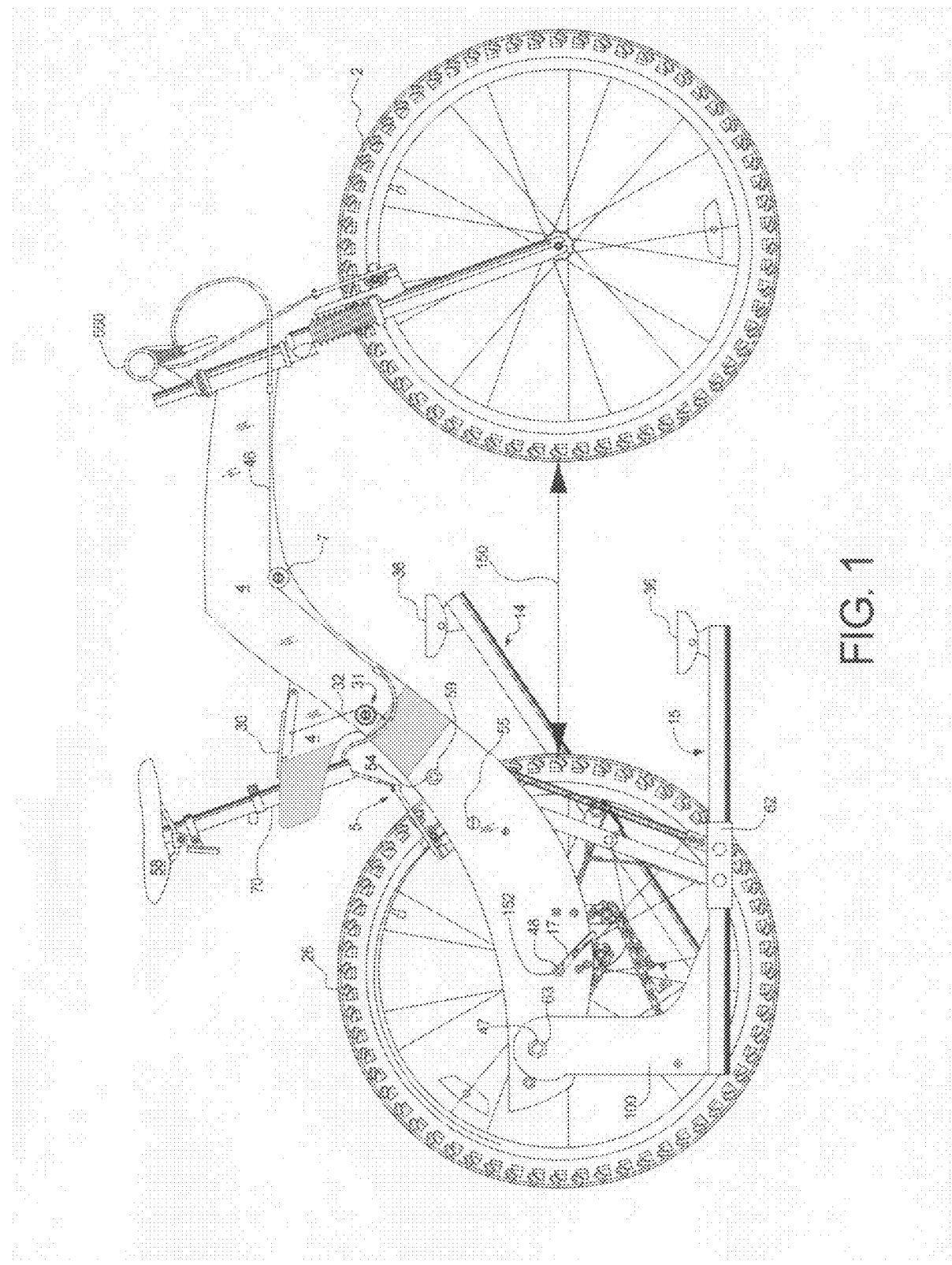
FIG. 1 shows a right side illustration of how the Lever Enhanced Pedaling System would compliment an unconventional bicycle frame.
Figure 2:
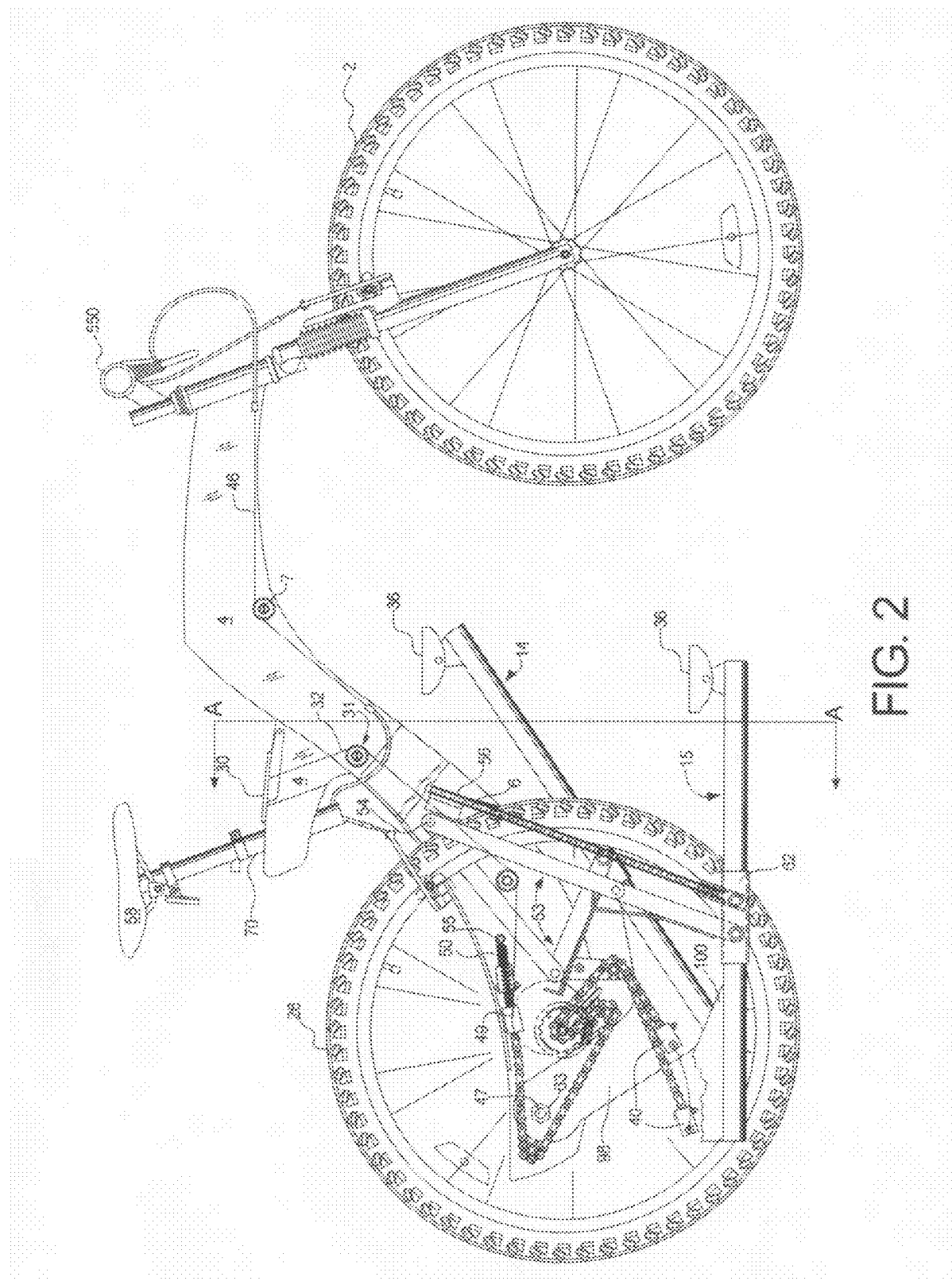
FIG. 2 illustrates multiple breakaway sections, exposing the preferred mechanical configurations of the Lever Enhanced Pedaling System and how their components are engaged to work with one another.

DRAWING--REFERENCE NUMERALS 2 front wheel
4 bicycle frame
6 repositioning chain
7 break cable pulley wheel
14 left lever system
15 right lever system
17 slanted notch
18 bracket bolts
20 bracket nuts
26 rear wheel
28 reverse system
30 manual reverse lever
31 reverse cable pulley system
32 reverse cable
33 transmission chain
34 direct rear wheel sprockets
35 transmission chain release system
36 pedals
38 chain travel maximizing arm assembly
40 cylinder
41 transmission load bolt
44 chain guiding sprockets
45 central lever beam
46 brake cable
47 fulcrum
48 rear wheel axle
49 spring-chain connector
50 transmission chain retracting springs
52 reciprocal chain connector cylinders
53 lever suspension system
54 suspension axle
550 handle bar
56 repositioning sprockets
57 extended hub
58 seat
59 suspension shaft nut
60 suspension bolt
61 suspension nut
62 pipe reinforcements -continued

DRAWING--REFERENCE NUMERALS

- 63 fulcrum shaft nut
- 64 reciprocal mounting bracket
- 65 reverse arm
- 66 reverse arm spring
- 67 24 reverse disks
- 68 disk rotation spring
- 69 suspension joint director
- 70 seat post cylinder
- 76 right pedal pin
- 78 left pedal pin
- 82 left pedal bore
- 84 right pedal bore
- 86 lead reinforcement cylinder bores
- 88 tubular bores
- 90 lever tubes
- 92 load bores
- 94 pedal mount bores
- 96 L-plate bores
- 98 left L-plates
- 100 right L-plates
- 102 right fulcrum bores
- 104 left fulcrum bores
- 106 groove of pedals
- 108 reciprocal chain link bolts
- 110 reciprocal chain link bores
- 112 cylindrical bores
- 114 reciprocal link nuts
- 116 upper reciprocal beams
- 118 upper reciprocal bores
- 120 lower pair beam bores
- 122 lower reciprocal beams
- 124 perpendicular beams
- 126 right angle component
- 128 suspension joint bolts
- 130 upper single beam bores
- 132 suspension joint nuts
- 136 lower single beam bore
- 138 second reinforcement cylinder bore
- 140 bicycle hub
- 142 middle transmission route assembly
- 144 arm stopper
- 146 extended sprocket
- 150 area between wheels not occupied by frame
- 152 axle nut

DETAILED DESCRIPTION OF THE INVENTION

Below is a description or definition of components, assemblies, materials and the mechanical configurations according to drawings illustrated in FIGS. 1 to 5 and 8. The lever enhanced pedaling system is composed of a frame 4 with each outer layer, apart from the steering cylinder, being cold bent from one piece of ¼" thick Aluminum sheet metal. Between the inner portions of these sides are two layers of ¼'" thick Aluminum sheet metal, cold bent and welded together in a "Y" shaped frame 4 for holding the seat post cylinder 70 between their inner divided walls. The seat post cylinder 70 is welded on opposite sides to the inner surfaces of the "Y" shaped assembly 4, close to where they make two tangent contacts within the "Y" structure. This "Y" shaped assembly is between the outer layers of the frame 4, extending from the steering cylinder and ending, above the rear brake components 5. The rear walls of the frame 4 are reinforced, horizontally (FIG. 5), from their angle of division to the area beyond the slanted axle notches 17 (FIG. 1), with an approximate "V" shaped Aluminum plate. The plate's outer sides are formed parallel after its angle in accordance with the inner surfaces of the frame's 4 rear portion. The plate is welded to the inner surfaces of the frame's 4 rear portion to prevent its sides from twisting. Thus, the majority, of the frames 4 body is composed of four layers of Aluminum sheet metal with the frontal top and bottom raised edges welded together for frame durability. This form of assembly, minimizing the number of small welded joints to the steering cylinder and seat post cylinder 70 to the frame 4, allows for a durable frame construction since many of the angles are cold bent instead of welded together.

The front wheel 2 is fastened to the front forks and the rear wheel 26 is fastened between the rear layers of the frame 4. The rear wheel 26 is composed of a hub, with connected spokes extending to the rim and a tire around the rim. Each side of the hub has a sprocket 34 connected to it with one direction rotation ability. Each sprocket 34 is rigidly joined to a separate member extended hub 57 and sprocket 146 (FIGS. 5 and 8) to enable a longer torque per pedal. The circumference of the extended sprockets 146 is significantly smaller than the direct rear wheel sprocket 34. The extended sprocket 146 (FIG. 8) is a welded assembly of a 1.195" outer diameter sprocket with hub welded to a steel centrally bored disk and disk welded to a cylinder 57. A cylinder 57 is welded to the teeth of the each slip/lock sprocket 34 so that its extended smaller member sprockets 146 may be one rigid assembly and turn on the same axis 48 (FIG. 1).

A chain member 33 of each extended sprocket 146 is to engage its teeth (FIG. 3) and rotate it in a forward manner. Behind the slanted notches 17 (FIG. 1) in the frame for the rear axle, are two bores for the levers (14 and 15) to accommodate their member fulcrum 47 through each surface of the frame's rear portion. Each bore accommodates a threaded ⅝" diameter bolt 47 which works as the fulcrums of the levers (14 and 15) for swing motion. The ⅝" diameter bolt 47 is fastened to the frame 4 with a nut 63. Each lever (14 and 15) has pivotal connection to an associated portion of the frame 4.

Figure 5:
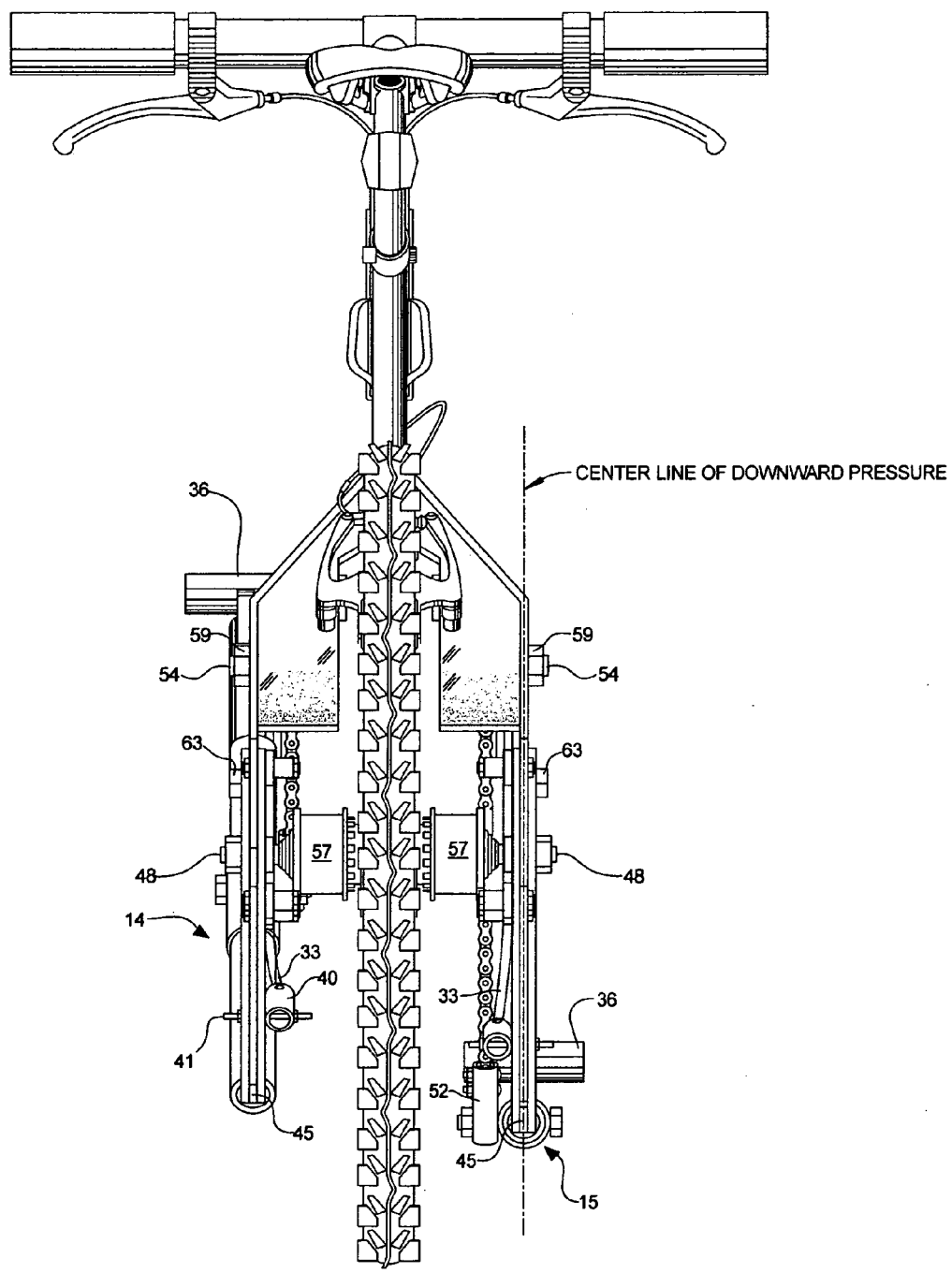
FIG. 5 shows the rear view of the lever enhanced pedaling system and how the levers (14 and 15) are aligned on a central line of downward pressure for quality pedaling.

According to the illustrations in FIGS. 1 and 5 the preferred configuration of each lever is as follows: From around the fulcrum 47, each lever extends as two plates (98 and 100) downwardly until its form begins to curve forwardly in a parallel beam shape into its member cylinder 90. A third beam 45 is between the layers of these two beams. This three beam configuration is designed to act as reinforcement to the cylinders 90 against downward weight and impact. The cylinders 90 are to have a groove cut in its top surface for accommodating the vertical plates (98 and 100) that descends (FIG. 5) to a low inner surface of the cylinder 90. The outer surfaces of each of the plates (98 and 100) are to be welded to a member cylinder 90 along the outer corners, where the plates (98 and 100) outwardly meet the cylinder 90. The frontal portion of each cylinder is occupied by separate beam members 45, which begins as a triangular shaped plate vertically descending to the lower inner surface of its member cylinders 90 and then forms a beam that extends rearward into the member cylinders 90. This beam 45 is to integrate into the other two beams (98 and 100) within the reinforcement cylinder 62. The triangular plate has a curved top angle. A bore 94 is through the center of this curve accommodating a shaft 76, which is a means of providing the mounted pedals 36 with pivotal ability. The outer contact angles where the triangular plate meets the cylinder 90 are to be welded together. Based on research and the illustration in FIG. 5 the rear forks of the frame are to be on center with the center of the propulsion levers (14 and 15) and pedals 36. This allows for downward applied pressure that is centralized with the rear structure of the frame, which in such cases may prevent the rear frame portion from twisting or flexing inward upon each downward pedal. Each transmission chain 33 member that is fastened to its cylinder member 40 engages the teeth of its sprocket 146 member having connections to the hub of the rear wheel 26.

The spring and chain connector 49 is composed of a metallic cylinder being occupied from its rear opening by the transmission chain 33. A bolt descends through the top rear surface of the cylinder, then through an opening in the chain 33 and then through the lower surface of the cylinder 49. The bolt is fastened in place by a nut. The frontal portion of the cylinder 49 is to be occupied by the transmission chain retractor spring 50 fastened in place within the cylinder by a JB Weld resin. The frontal end of the transmission chain retractor spring is fastened in place with a bolt 55 (FIG. 3) and nut to the inner surface of the frame 4.

Figure 3:
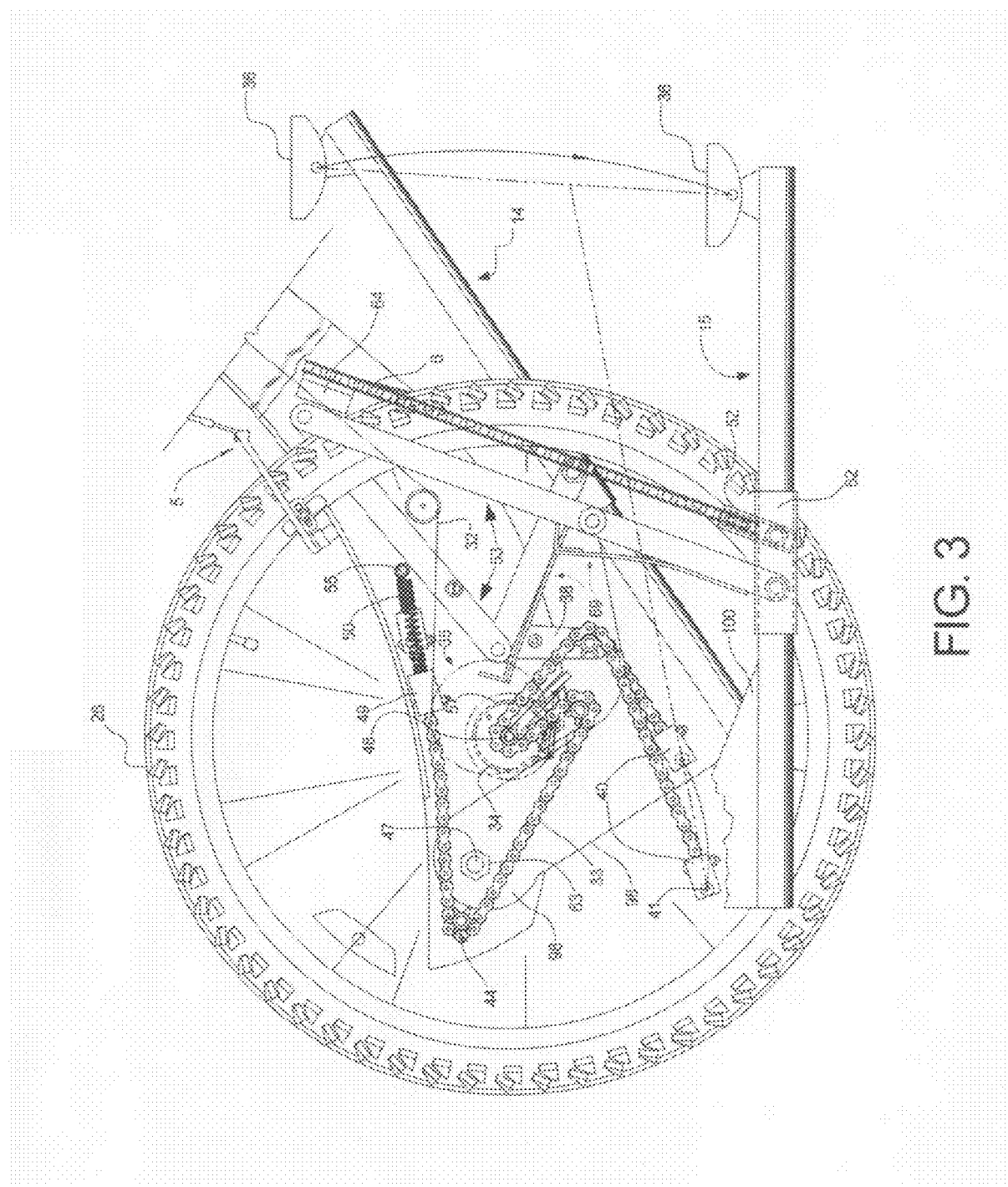
FIG. 3 shows enlarged multiple breakaway sections of mechanical configurations, which include the interaction of transmission chains 33, lever suspension systems 53 and the lever repositioning system.
Figure 4:
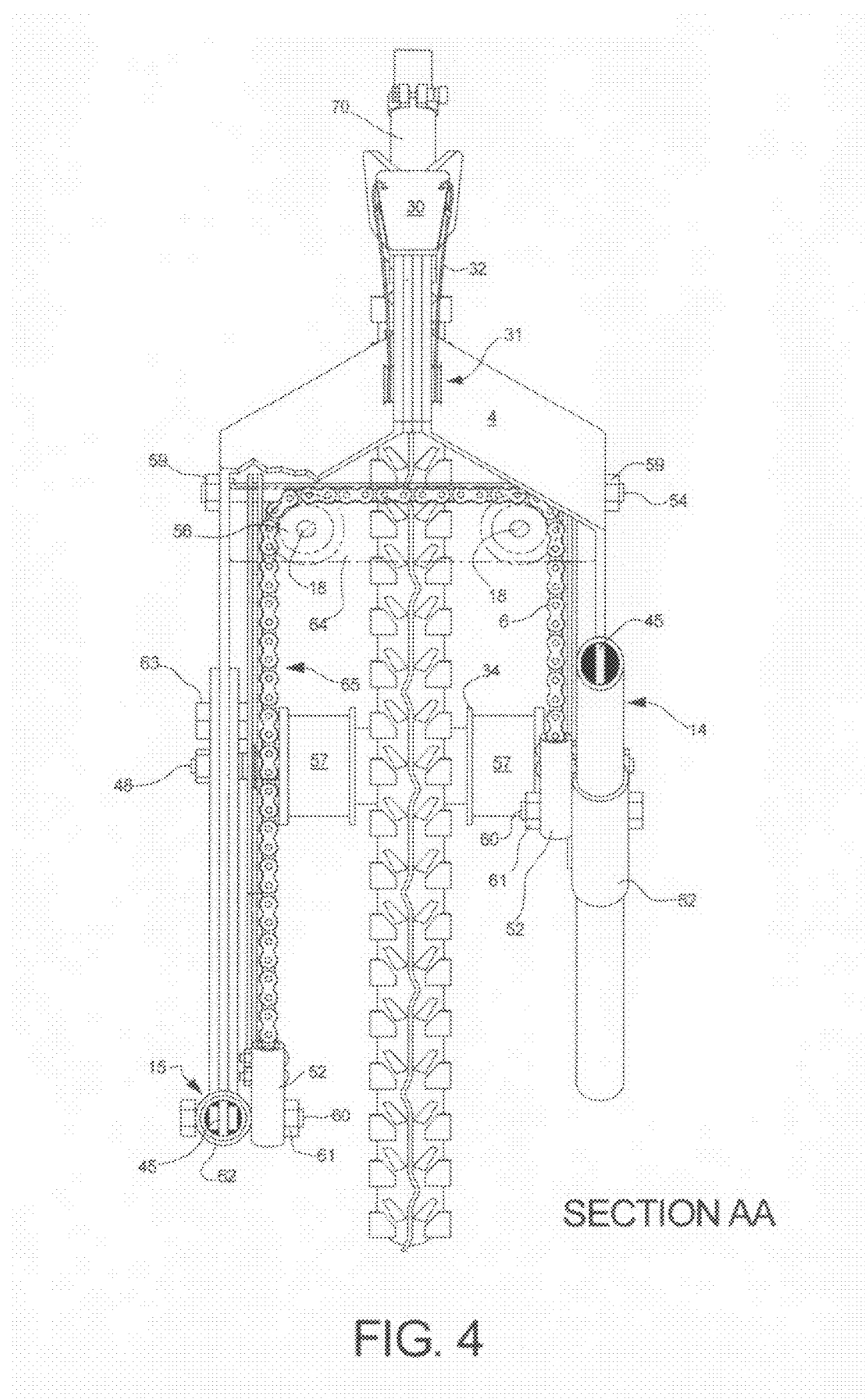
FIG. 4 illustrates the frontal portion of Section AA which exposes the repositioning system and the reverse lever 30 connection to its member cables 32.

The description or definition of the components, assemblies, materials and mechanical configuration in drawing FIG. 3 illustrating the lever repositioning system 65 is described as follows:

Between the inner surfaces of the frames 4 rear portion under the seat post is a bracket 64 with bent ends fastened against the inner surface of frame (FIG. 4). Fastened to the bracket 64 are right side and left side sprockets 56 fixed in their position with rotational ability. A high strength chain 6 is meshed with the outer and upper teeth of both sprockets 56. This chain 6 is suspended by both sprockets and each end descends into separate steel cylinders 52. Each end of the high strength chain 6 is fastened within their member cylinders 52 with two bolts 108 and nuts 114. Two thick bolts 60 occupies each group member of aligned bores (79, 86, 88, 96 and 138) of each lever's cylinder portion, beams (45, 98 and 100), steel reinforcement cylinder 62 and reciprocal chain connector cylinder 52, for a strong pivotal connection. A nut 61 fastens this bolt 60 into place.

Figure 6:
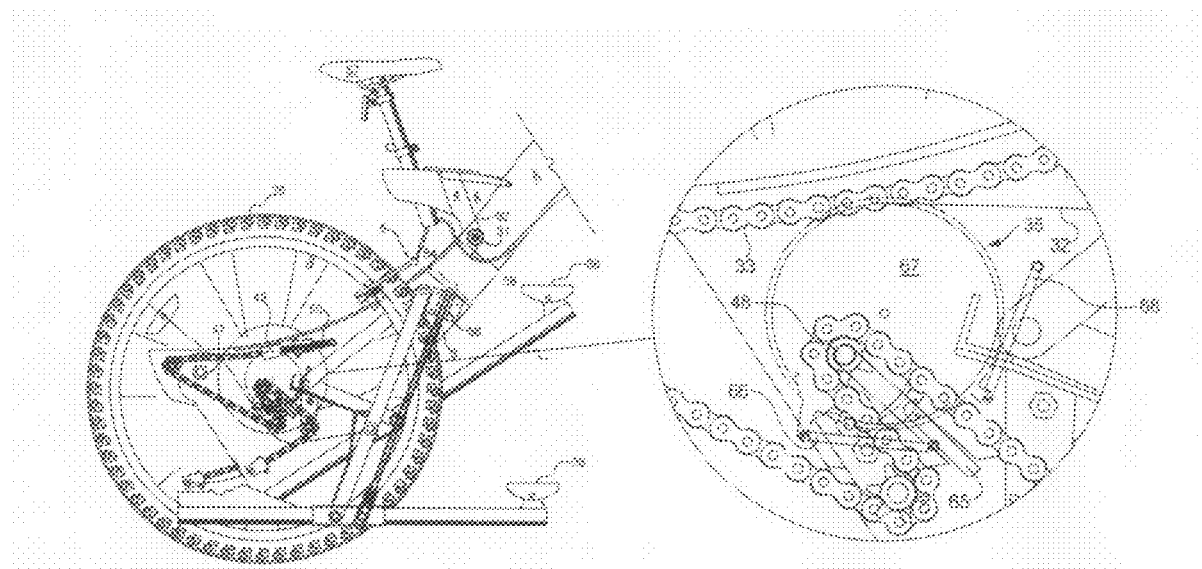
FIGS. 6 to 7 shows animated views of the reverse lever 30 and how its member components react to its manual rotation for freeing the sprockets of the rear wheel 26 for reverse movement.
Figure 7:
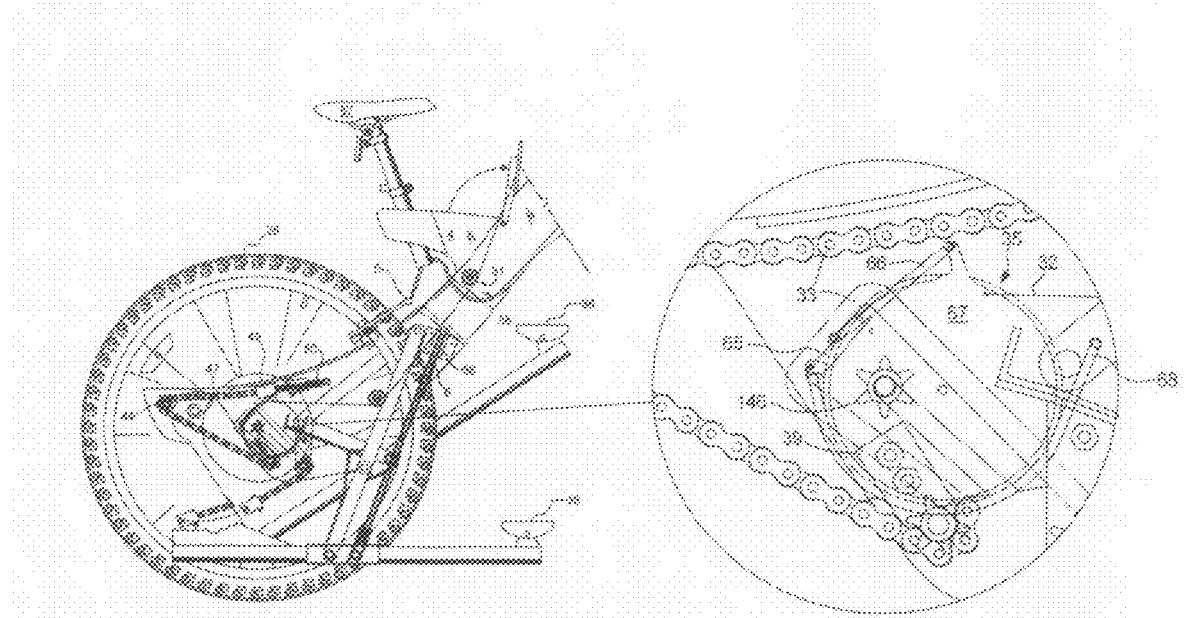

The reverse system 28 (FIG. 21) allows the rear wheel 26 to be moved backwards, free from the transmission chains 33, which have limited movement. The description or definition of the components, assemblies, materials and mechanical configuration in drawing FIGS. 3, 6 and 7 illustrating the reverse system is described as follows:

The system is composed of a manual lever 30, a cable 32 for each rear wheel sprocket, a pulley wheel system 31 for each cable, and disk 67 shaped machine 35 for each system mounted to opposite inner surfaces" of the frame 4 with pivotal ability.

The manual lever 30 is composed of an assembly of two parallel linear members fixed to perpendicularly to a plate (FIG. 4). The horizontal plate has edges that extend right and left for allowing the rider to grip and pivot (FIG. 7) the plate 30 toward the front of the frame 4. The frontal portion of the parallel linear members would have adjacent bores aligned with a third bore in the frame 4. A bolt serves as a fulcrum occupying the three holes and is fastened with a nut. The parallel sides of the lever's linear portion 30 face outward. Two vertical holes, opposite one another, are positioned near the edge of the horizontal plate 30 (FIG. 4). A cable 32 runs through each hole up and around the outer edge of the lever's 30 handle portion, forming a fastened loop (FIG. 4). The loops are to be fastened by electric wire splicers. Each cable 32 runs through the grooves of their associated pulley system 31, which guides them to their member disk 67 shaped machine 35 mounted with pivotal ability to the inner surface of the frame 4 (FIGS. 6 and 7). Each disk 67 has connected near its lowest curve (FIG. 6) a small pivotal beam 65 with a groove to accommodate the width of the transmission chain 33. As this beam 65 makes contact with the transmission chain 33, it pivots toward the rear of the bike, but is rigidly stopped by a shaft 144 from the outer walls of its disk shaped member 67. A spring 66 is connected to this protruding portion and an extended shaft from the frame 4 to pull the beam 65 back to its original position away from transmission chain 33. Each disk 67 can be rotated until its pivotal beam member 65 lifts its transmission chain member 33 off of its extended sprocket 146 member. A second spring 68 is connected to a second protruding surface from the curve on each disk 67 which pulls the disk back to its original position and components out of the way of the transmission chains 33. This second spring 68 also maintains pulling tension against its reverse cable 32 member fastened to reverse lever 30. The reverse cable 32 connected within the groove of its member disk 67 machine 35 allows the top curve of disk 67 to be rotated toward the front of the bike, while the reverse lever 30 is being pivoted upwards (FIG. 7). The reverse cable 32 is to fall within the curved groove of its disk member 67 for repeated reverse action.

The description or definition of the components, assemblies, materials and mechanical configuration in drawing FIG. 3 illustrating the lever suspension system 53 is described as follows:

The foundation for suspending the levers is composed of a steel threaded shaft 54 (FIG. 4) fixed within the rear divided portion of the frame. The shaft 54 is positioned perpendicularly with opposite ends occupying separate right and left member bores. The shaft 54 is fixed in place by nuts 59 which are to be welded in place for quality and endurance. Hanging from this shaft 54 are right and left arms of the suspension system of parallel beams arms of the suspension system 53 adjacent to opposite inner surfaces of the frame. The threaded shaft 54 occupy the bores of each pair of parallel beams 116 enabling the beams to swing back and forth. Between the lower end portions of each parallel beam 116 is a separate single beam member 122. Each right and left single beam 122 has pivotal connection between their member pair of parallel beams 116. The pivotal means are composed of separate bolts 128 through the bores in the lower portion of opposite parallel beams 116 and bores in the upper portion of each singular beam 122. The lower portions of right and left singular beams 122 have pivotal connection to a steel cylinder 62 (FIG. 3) with inner walls accommodating the Aluminum pipe 90 as reinforcement. The pivotal connection means of the lower singular beams 122 and their member steel cylinders 62 are composed of separate member bolts 60 (FIG. 4) occupying bores in the lower portion of singular beams 122 as well as aligned bores that run through the assemblies of steel cylinders 62 occupied by Aluminum pipes 90. Each bolt 60 is fastened into place with nuts 61 that are to be welded in place for endurance (FIG. 4). The rear surfaces of each single beam 122 has a steel bar 124 (FIG. 3) welded to its rear lower portion that extends to just above the singular beams 122 top curve. This rear component 124 has welded to its top frontal surface a short 90 degree angle steel piece 126 that maintains tension against the lower rear surfaces of parallel beams 116. The tension results in the rear components 124 resistance to be flexed into a slight curve after being straight. This curve is to begin where the merged portion of the rear component 124 and singular beam 122 stops. The tension against the lower portion of the parallel beams 116 is to direct the pivotal portion in bending rearward when its member lever (14 or 15) is lifted upwards.

Operation—FIGS. 1 to 7

The operational manner of using the L.E.P.S. and its' mechanical reactions are unique when compared to the prior art stated in this application. The description or definition of the components, assemblies, materials and mechanical reactions in FIGS. 1 through 7 illustrating how the bike works is described as follows:

Each transmission chain member 33 that is associated with the pedal 36 being depressed, would directly rotate its rear wheel sprocket member 146 forward, thus rotating the rear wheel 26 connected to it forward. Torque would be transferred from the extended sprockets 146 throughout the hub assembly (57 and 34) to the rear wheel 26. The extended sprockets 146, extended hubs 57, freestyle sprockets 34 and rear wheel 26 are rigidly coupled to one another making them one assembly. Thus, the rear wheel 26 would rotate forward moving the bike forward. If the right propulsion lever 15 was depressed, the reciprocal chain end 6 fastened with pivotal ability to the lever assembly 15 would be pulled down while engaging the teeth of its right side sprocket member 56 mounted within the frame of the bike (FIG. 4). The opposite end of the reciprocal chain 6 fastened to the left lever assembly member 14 with pivotal ability would pull its lever member 14 upward toward a left sprocket member 56 which is suspending the left end of the reciprocal chain 6. This portion in contact with the left sprocket 56 would engage its teeth in a rotational motion that is in accordance with the chains 6 movement. The same opposite reaction would occur if the left pedal 36 was depressed. The transmission chain retractor spring 50 associated with the lever 15 or 14 being rotated upward would pull the associated transmission chain 33 forward so that the transmission chain 33 can be repositioned to rotate its extended sprocket member 146 forward for acceleration. Because each transmission chain 33 has limited movement, each chain has to be removed from the teeth of their member sprocket 146, so that the rear wheel 26 may move backwards freely. This is done by lifting up the end portion of the reverse lever 30 close to the seat post cylinder 70. The reaction that would occur, based on the illustrations in FIGS. 6 and 7, is that the leading ends of the right and left cables members 32 fastened to the horizontal edge of the reverse lever 30 would be lifted upwards. The greater portion of these cables 32 would be pulled forward. The right and left disk 67 machines 35 connected to their member cable 32 would rotate. Their upper curves would move forward, while the pivotal beams 65 near the lower curve would move rearwards (FIGS. 6 and 7). These pivoting beams 65 would turn to extend the transmission chains 33 away from the teeth of their modified sprocket members 146. This extending movement would firstly move the transmission chain 33 ends connected to their retraction spring members 50 and then disengage the transmission chains 33 from their member extended sprockets 146 from back to front. This would enable the rider to move the bicycle backwards.

Besides the improved conditions of the bicycle with L.E.P.S., the bicycle would come standard with front brakes, back brakes and reflectors for night cycling.

Function and Assembly Description

Below is a definition of the drawings and description, explaining how to assemble each critical component pertaining to the L.E.P.S and what purpose each component plays in the function of the lever propulsion system with the intention of allowing a person of ordinary skill to make or use the invention established in the claims.

Figure 9A:
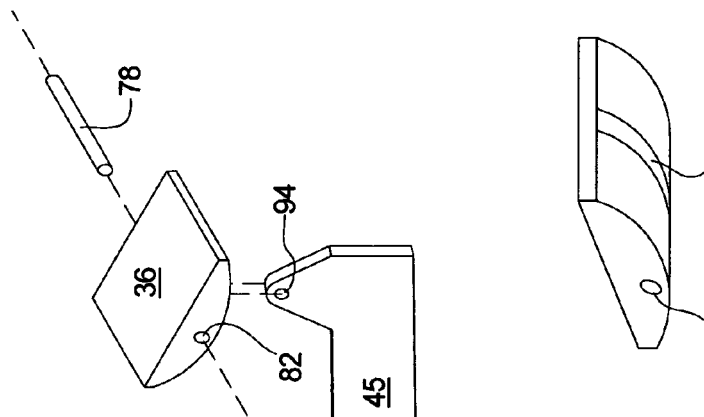
FIGS. 9-9A shows the right and left leading reinforcement beams 45 for each lever machines (14 and 15) tubular structure and how the pedals 36 are assemble to them.
Figure 9:
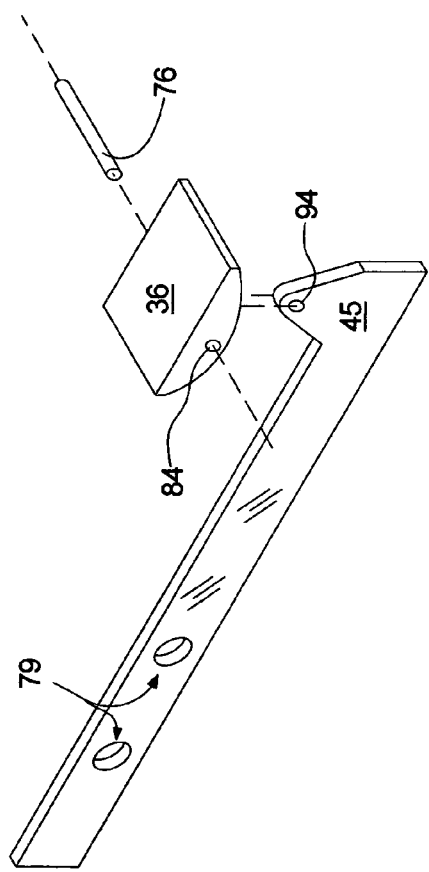
Figure 10:
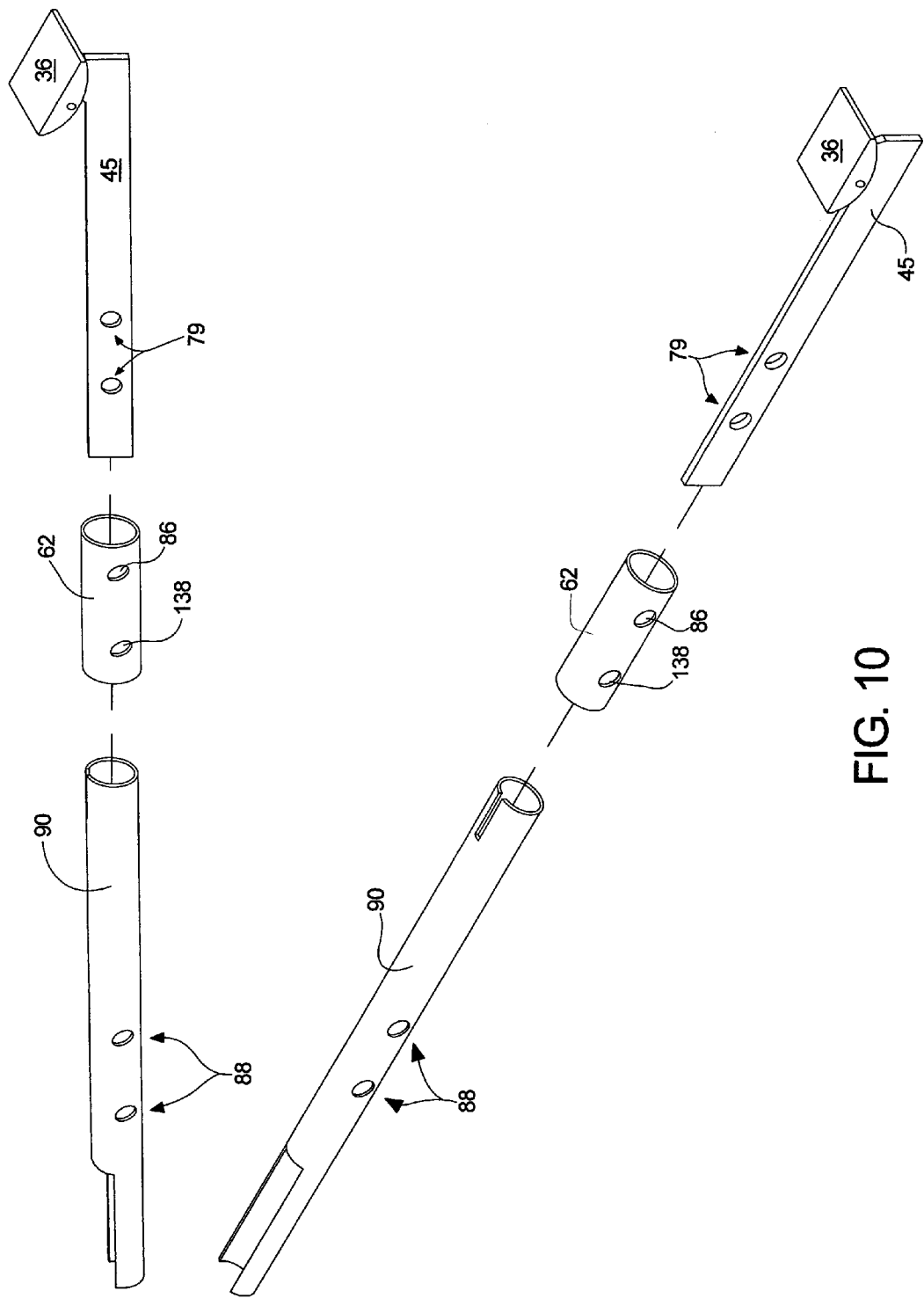
FIG. 10 shows how to assemble the tubular leading and middle parts of each lever tubular 90 structure after the pedals 36 are assembled.

The pedals 36 have a flat top surface which could be constructed out of any inflexible material be it metallic or plastic. The pedals 36 have a bore 84 (FIG. 9A) which is through the side of each pedal near the bottom curve of each pedal. The curved bottoms of each pedal 36 gives the pedals maximum pivotability while the bicycle is being pedaled. Through the bottom curve of the each pedal 36 is a groove 106 (FIG. 9A), which allows the filleted angle of the steel reinforcement beams 45 to rigidly fit within the groove 106. Each triangular end of the beams 45 are inserted into their member pedal's 36 groove 106 until the bores of each triangle 94 and pedal 84 are aligned. Then the pin 45 is to be force fitted in their member pedals bore 84 until the pins are flush to the surface of the pedals 36. The metal beams 45 are then to be inserted into the tube 90 of their member lever machine until both pair of bores (79 and 88) are in alignment FIG. 10. Each reinforcement cylinder 62 is to be inserted around their member lever machine tube 90 until both pair of bores (86, 88 and 138) are in alignment.

Figure 11:
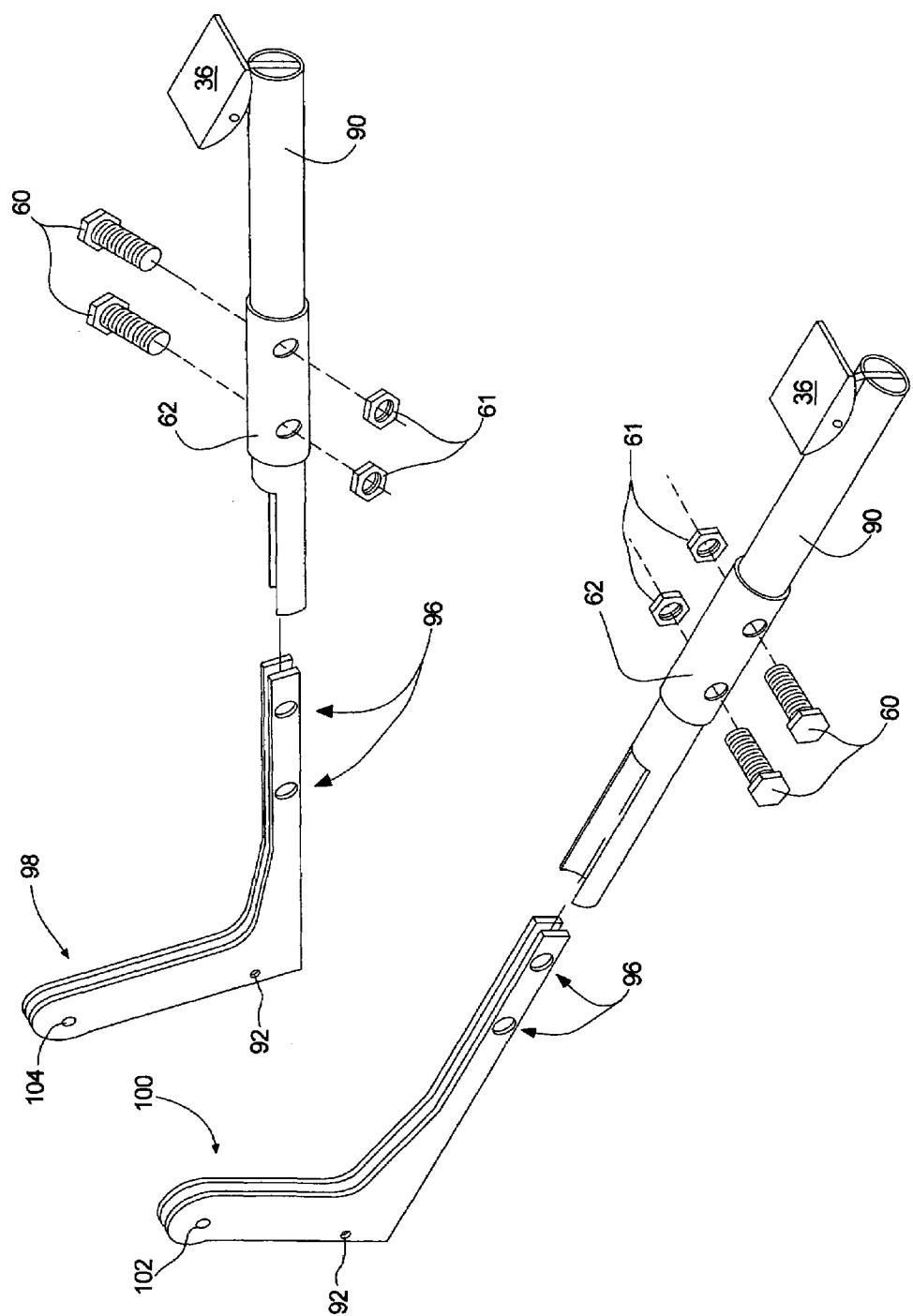
FIG. 11 shows how to integrate the L-shaped plates (98 and 100) into each lever's tubular (90) structure after its reinforcement components have been added.
Figure 12:
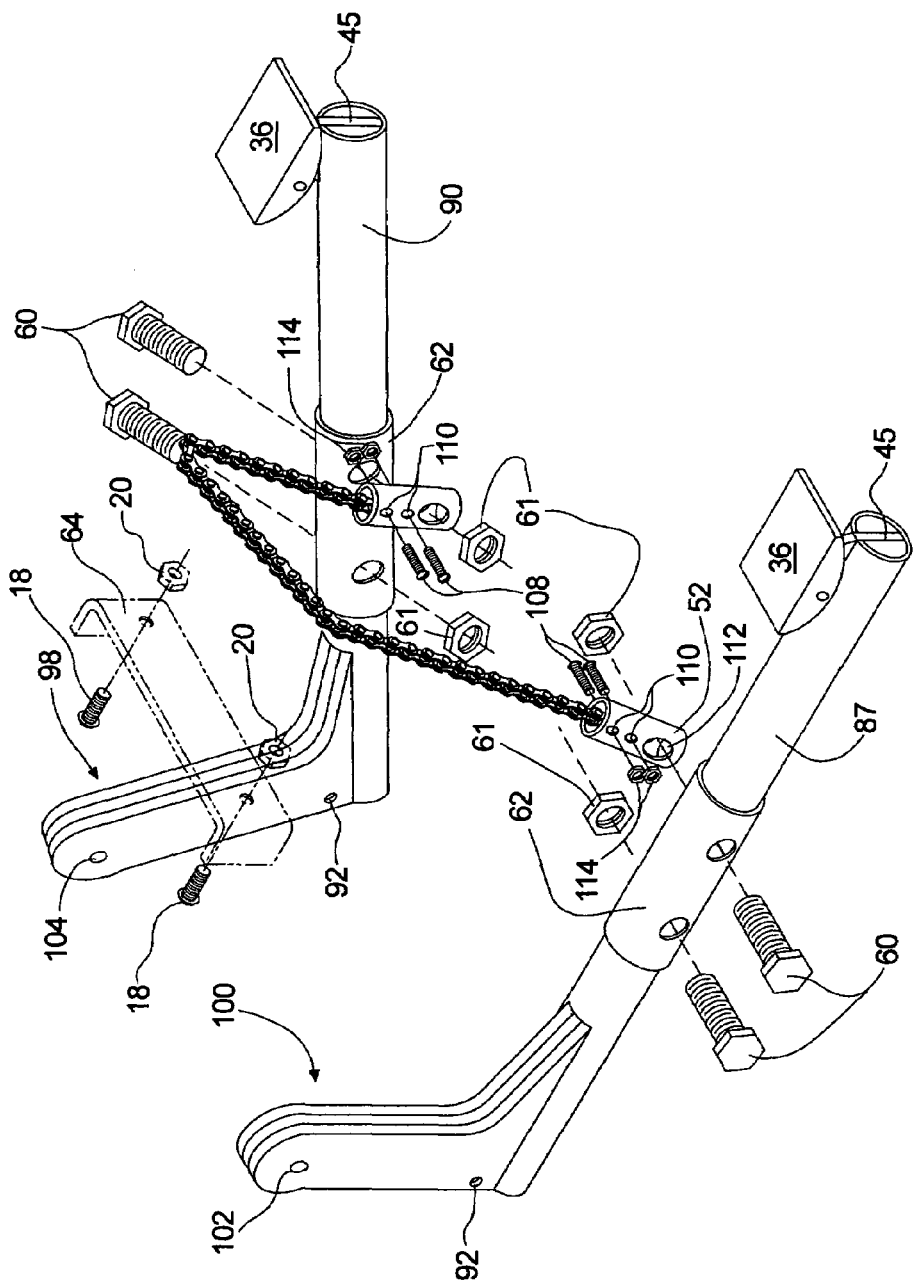
FIG. 12 shows how to assemble the repositioning chain 6 and fasten it to the L-shape lever assembly (14 and 15).

Each L-shaped pair of plates (98 and 100) is to be inserted (FIG. 11) into their member lever machine tube 90 until both pair of bores 96 and 88 are aligned. Each L-shaped plate pair (98 and 100) is to be on opposite sides of their member reinforcement beam 45 while their bores (79 and 96) are aligned. After the metallic components of each lever machine (14 and 15) are assembled, each pair of aligned bores is to be fastened in place with bolts 60 and nuts 61. Each end of the repositioning chain 6 is to be inserted into a reciprocal chain connector cylinder 52. Two open through spaces in the chain links of the repositioning chain 6 is to accommodate two bolts 108 after the bolts are inserted into the two bores 110 in each cylinder 52. Each leading bolt 60 in the lever machines (14 and 15) are to be inserted into the largest bore 112 in the reciprocal cylinder 52. Each reciprocal cylinder 52 is fastened in place with nuts 61.

Figure 13:
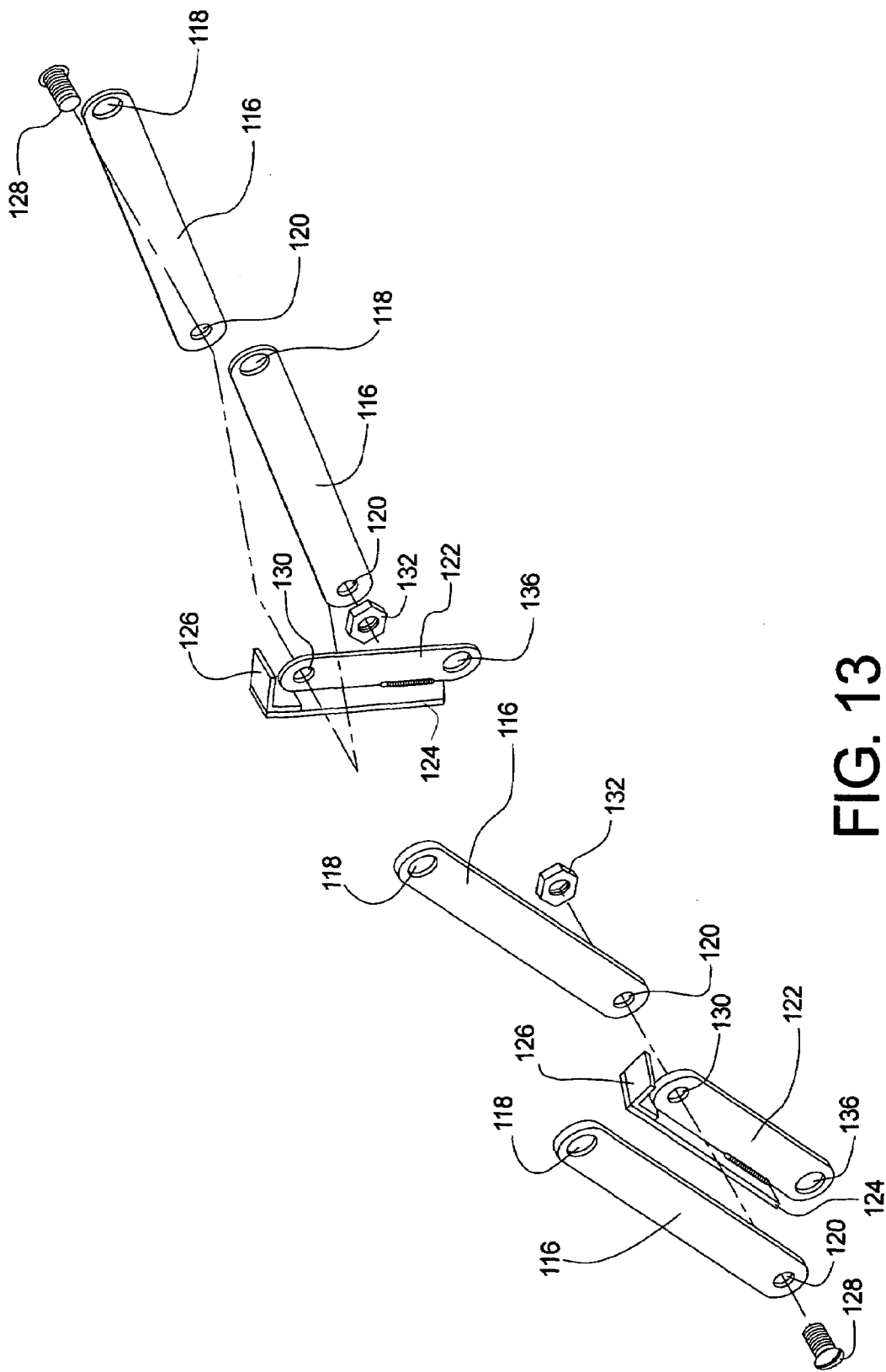
FIG. 13 shows how to assemble the lever suspension system 53.
Figure 14:
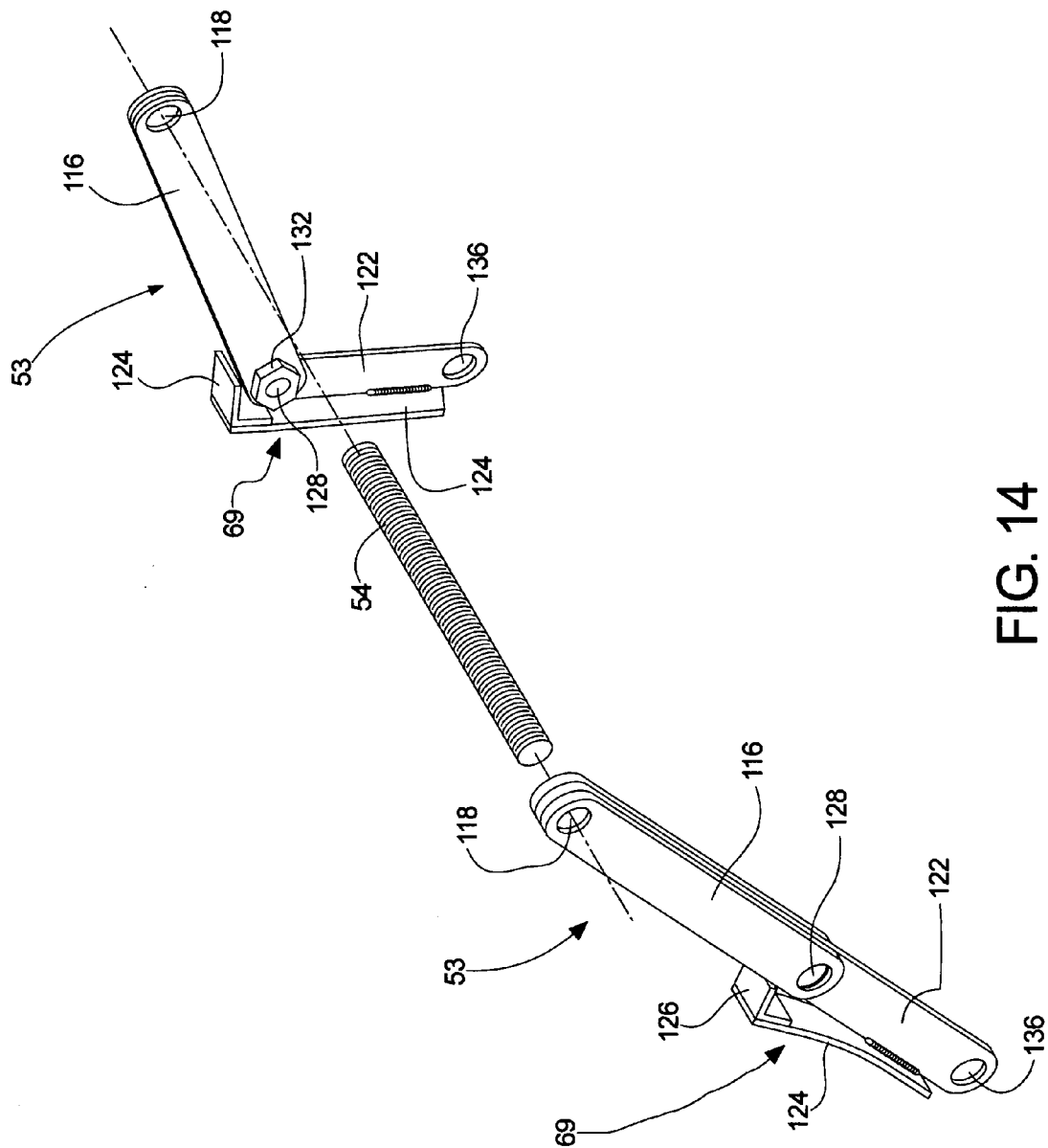
FIG. 14 shows how the suspension system 53 should look after it is assembled.
Figure 15:
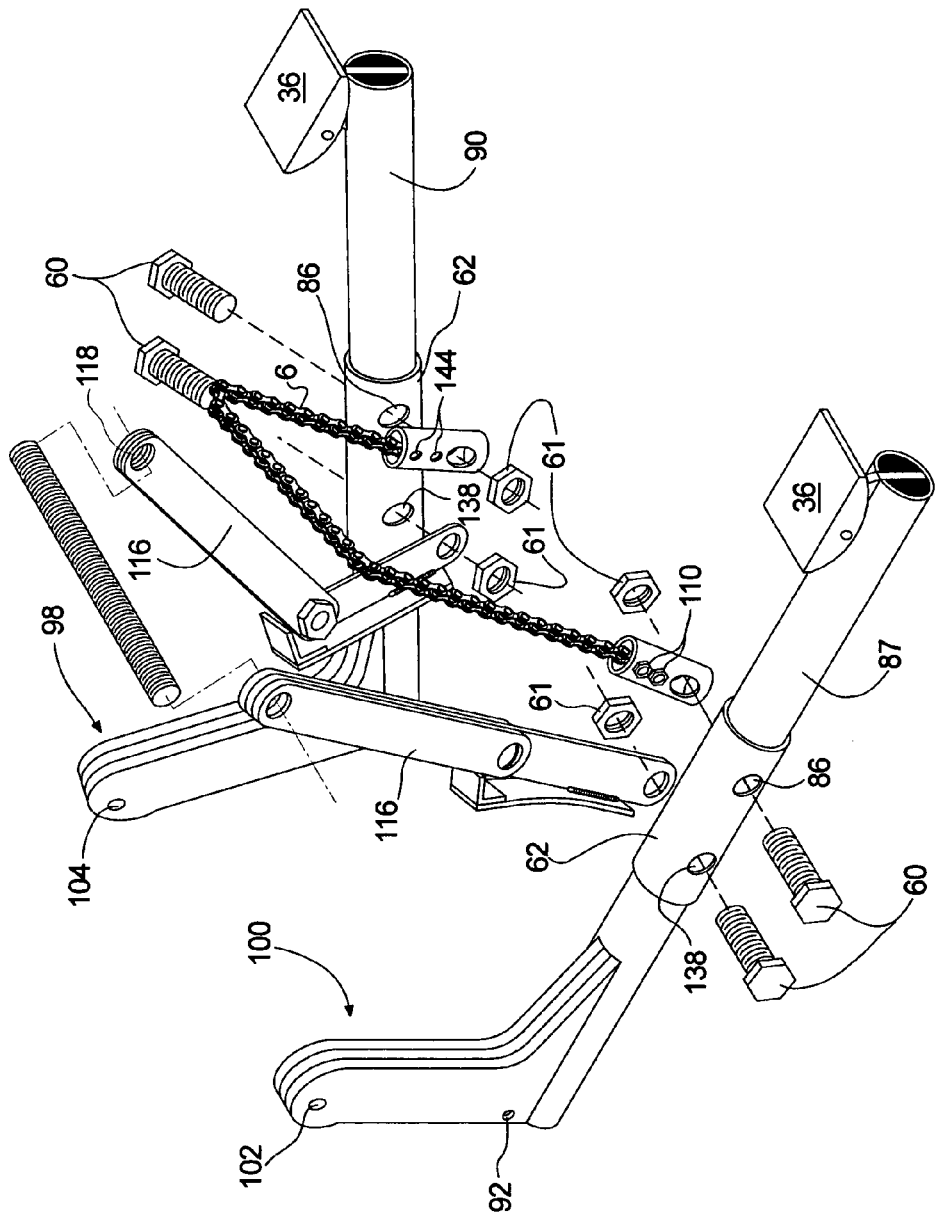
FIG. 15 shows to assemble the repositioning system and suspension system 53 to the lever propulsion machines (14 and 15).

The lever suspension system 53 is composed of two parallel metal beams 116 with bores 118 in the upper ends and bores 120 in the lower ends (FIG. 13). It is also composed of two single beams 122 with a welded perpendicular beams 124 on the rear edge of each single beam and a right angle metal piece 126 welded to the upper part of each perpendicular piece 124. These welded parts are designed to act as a pivotal joint to the parallel beams 116 and spring back the assembled joint towards the rearward position so that the suspension system 53 can pivot and retract in one direction as each suspension system's 53 member lever machine 14 and 15 lifted upward. A bolt 128 must be inserted in the lower bores 120 of the parallel beams 116 and upper bores 130 of the lower beams 122 after the bores are aligned as illustrated in (FIG. 13). A nut 132 is fastened to each bolt 128 after its insertion into member bores (FIG. 14). After the suspension system 53 is assembled, the lowest bores 136 of each system 53 is to be aligned to a second member bore 138 of each reinforcement cylinder 62. Then a bolt 60 is to be inserted into the bores (88, 79 and 136) aligned to the outer bore 138 of the reinforcement cylinder 84. Then a nut 94 is fasten to bolt 92 hold in place. Another duplicate bolt 92 of this type is to be inserted into the outer bore 86 of the reinforcement cylinder 84 after the bores (86, 79, 88, 96 and 112) located in front of the former aligned bores (135, 88, 79 and 136). A nut 61 is fasten to this bolt 60 to hold in place.

Figure 16:
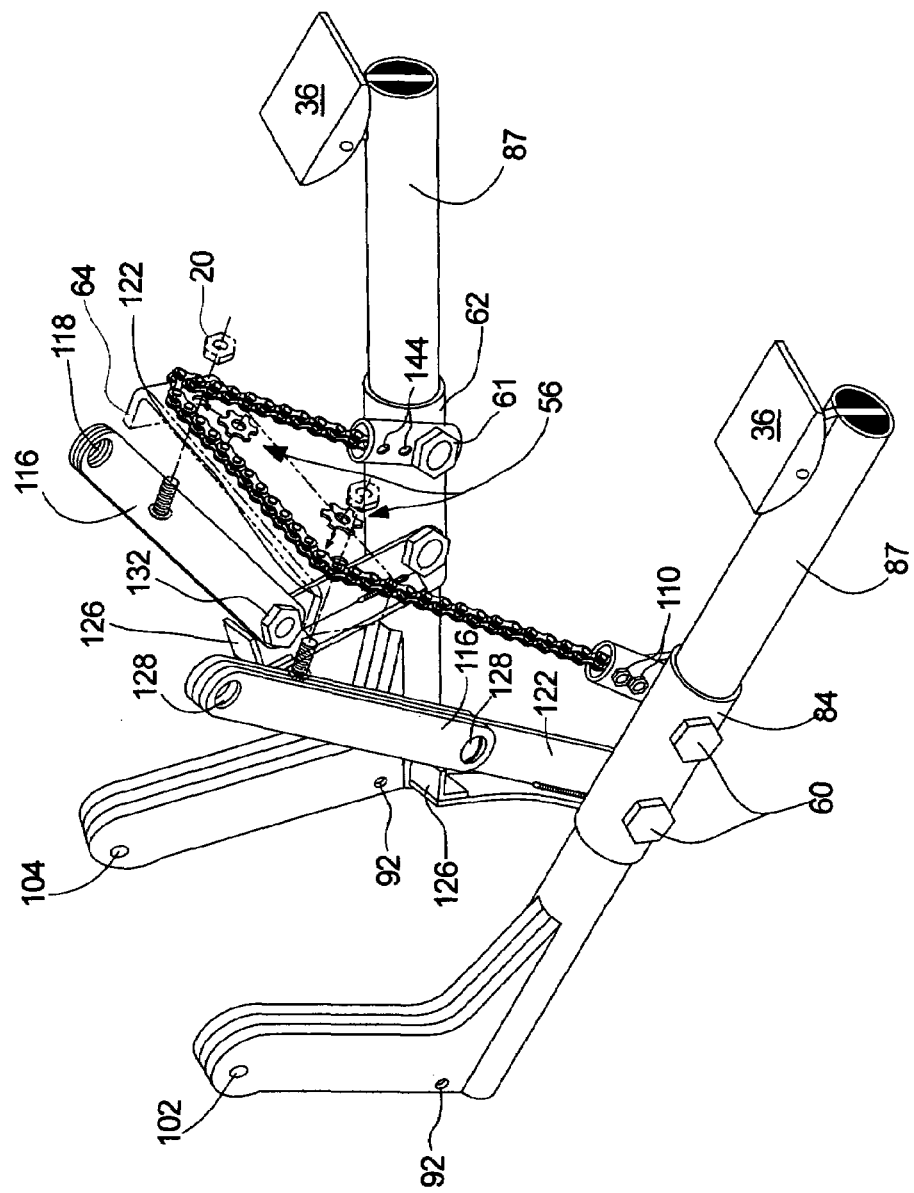
FIG. 16 shows how the repositioning system, suspension system 53 and propulsion machines (14 and 15) should look after they are assembled. The repositioning sprockets 56 are illustrated before they are integrated into the repositioning chain (6).
Figure 17:
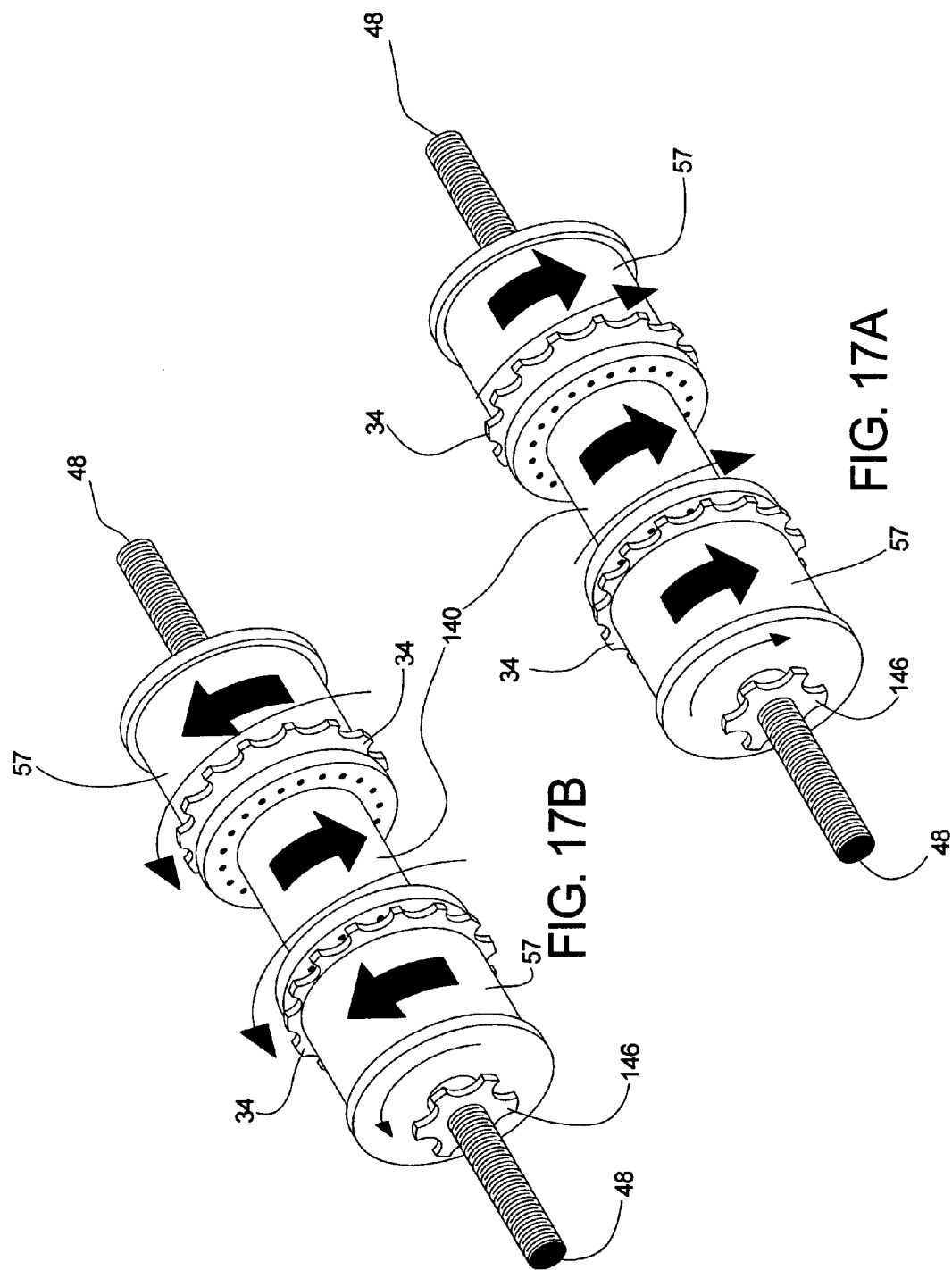
FIG. 17A illustrates a close up look of how an extended sprocket 146 moves the entire hub assembly when torque is applied to it from a transmission chain 33.
FIG. 17B illustrates a close up look of the how the hub assembly continues to rotate forward along with the rear wheel 26 when an extended sprocket 146 slips back during transmission chain 33 repositioning.
Figure 18:
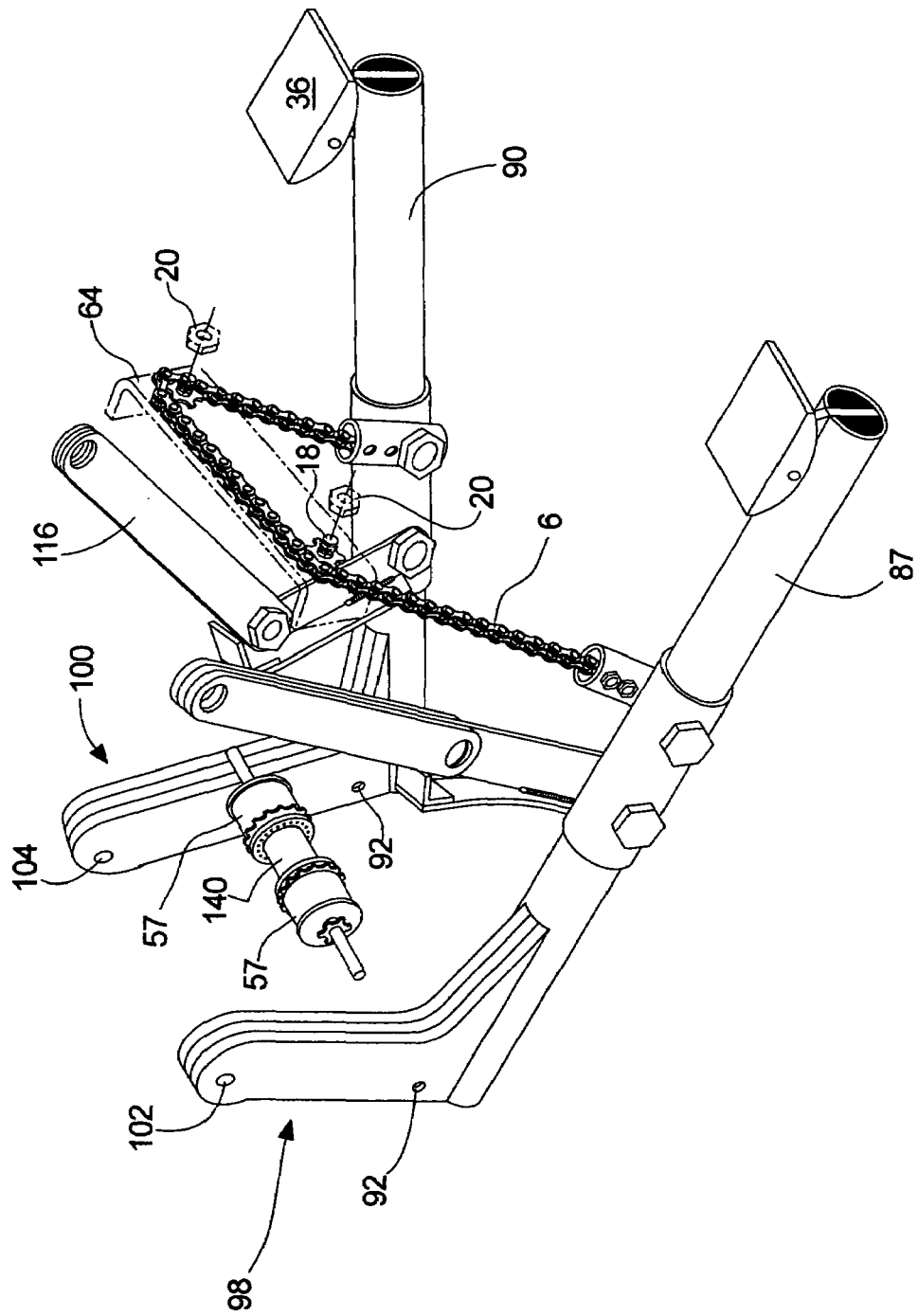
FIG. 18 shows where the hub 140 and sprocket assembly is located relative to other systems.
Figure 19:
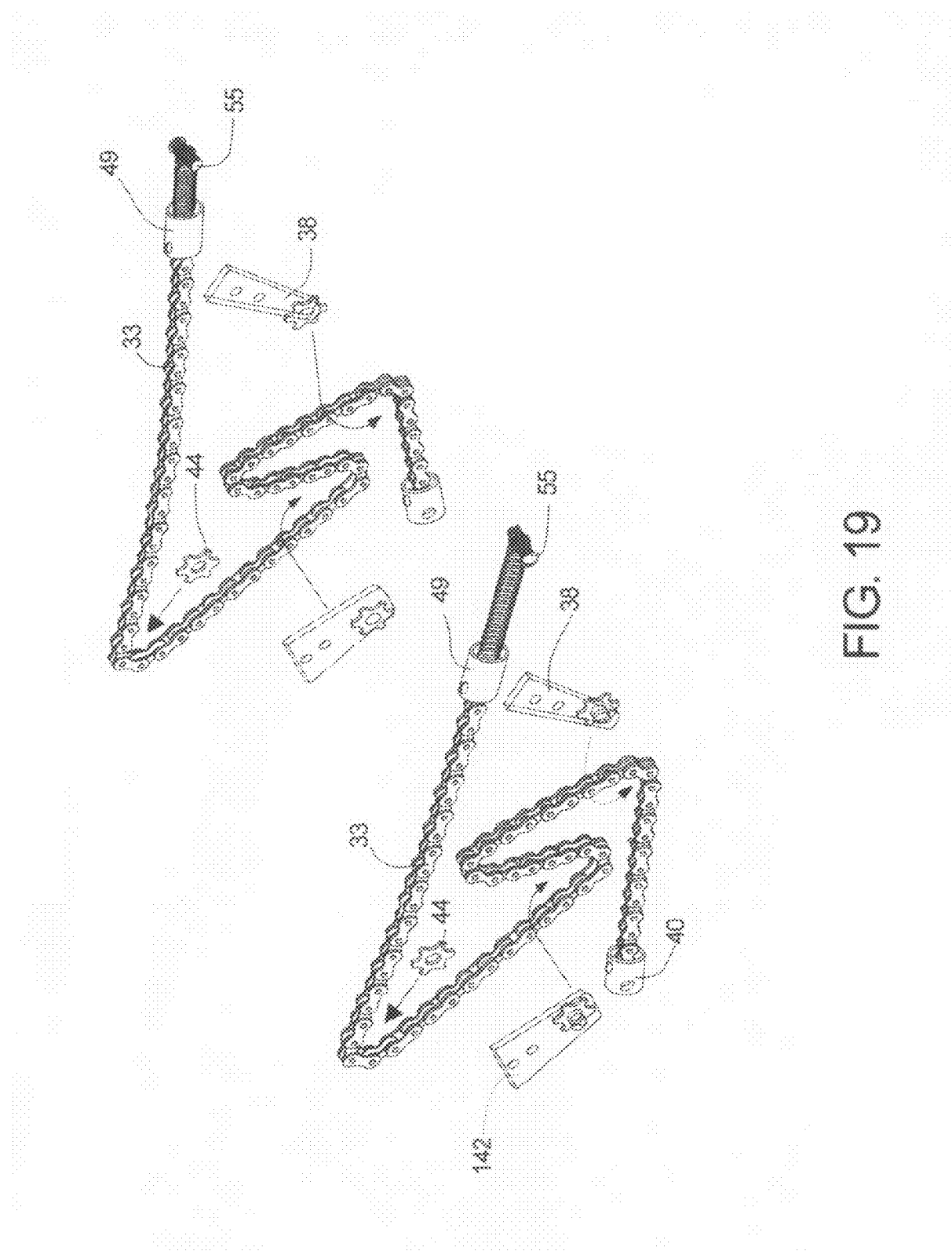
FIG. 19 shows how the transmission chain 33 should look after its end components are assembled. It also illustrates each transmission chain's member routing sprockets (142, 38 and 44).
Figure 20:
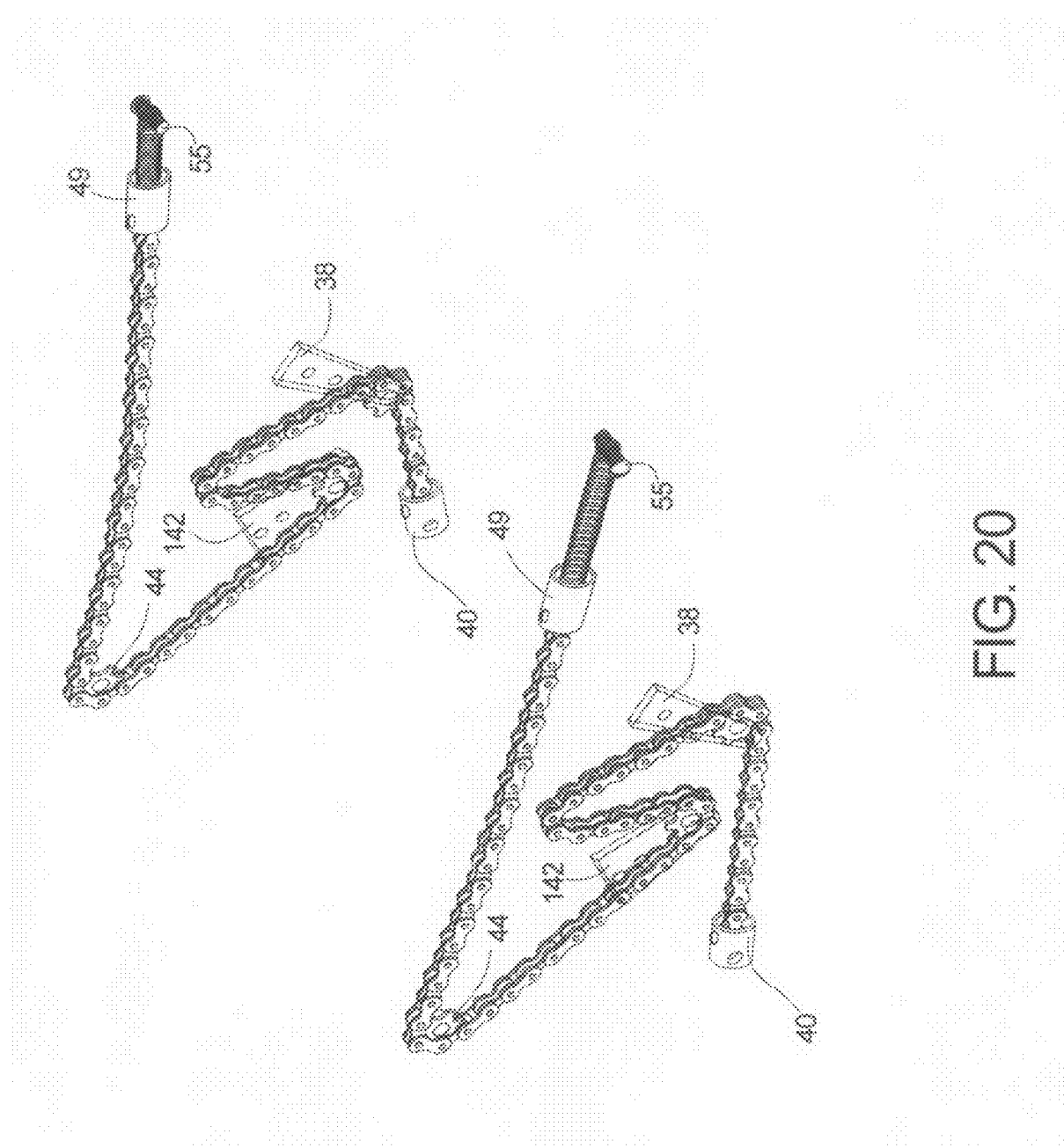
FIG. 20 shows how the transmission chains and routing system (38 and 142) should look after it is assembled.

Two sprockets 56 (FIG. 16) are to be integrated into chain links of the repositioning chain 6. The hub 140 of the rear wheel includes an assembly of a first member slip/lock sprocket 34 screwed into its right side and a second member slip/lock sprocket 34 screwed into the left side of the hub 140 connected to the rear wheel 26. Both sprockets 34 have the means to rotate backwards, but lock against the rear wheel when rotated in a forward direction. This locking resistance would grab and turn the hub 140 and it wheel 26 attachment in a forward direction. Since the frame's rear symmetrical portion is wide for the purpose of being in alignment with its member lever machines (14 and 15), each slip/lock sprocket 34 would have to have a smaller sprocket 146 attached to it, but extended outwardly by a extended hub 57 attached to the outer teeth on each sprocket by the welding process. The smaller sprocket 146 attached to the extended hub 57 would provide more range of travel per downward pedal because of its smaller radial circumference. The smaller sprocket would be, placed near the inner surface of the bicycle's rear frame 4 so that it may be near the alignment of the transmission chain 33 coupled to the rear bore 92 of its member lever machine (14 and 15). According to FIG. 17A when the transmission chain 33 pulls either extended sprocket 146 the entire hub assembly should move in the forward direction. However, according to FIG. 17B when the transmission chain retracting spring 50 pulls the transmission chain 33 in the opposite direction while the bicycle is moving forward, the extended hub 57 along with the connected conventional sprocket 146 would slip backwards while the bicycle's hub 140 connected to the rear wheel 26 would move forward as indicated by the arrows. The small arrows indicate the movement of the sprockets (34 and 146). The larger arrows indicate the movement of the hubs (57 and 140). The axle 48 of the hub assembly is threaded to allow the hub assembly to be rigidly fastened to the frame using nuts 152 (FIG. 24). The transmission chain 33 is to be inserted into cylinders 40 and fastened into place vertically with a bolt 154 and nut 156 (FIG. 3). Two duplicate bolts 154 are to occupy an open space in the link at the end of each transmission chain 33. Each transmission chain 33 is to be linked around a leading routing component 38, then around the extended sprocket 146, then around the middle routing component 142 and then around the rear routing sprocket 44 (FIG. 20) to lead forward towards the suspension system 53. The front open space in the end link of the transmission chain 33 is to be aligned to the vertical bores of the spring-chain connector 49. Then a bolt is to be inserted into each hole alignment and fastened with a nut 154. A J.B. Weld® resin is to be poured into the front end of each spring-chain connector 49 and each extension spring 50 is to be inserted into said front end of the spring-chain connector 49 to be rigidly settled in place after the J.B. Weld® resin has dried. The other end of the spring 50 is to have its loop occupied by a bolt 55. Each transmission chain 33 has this configuration (FIG. 20). This bolt 55 is fastened to the frame 4.

Figure 21:
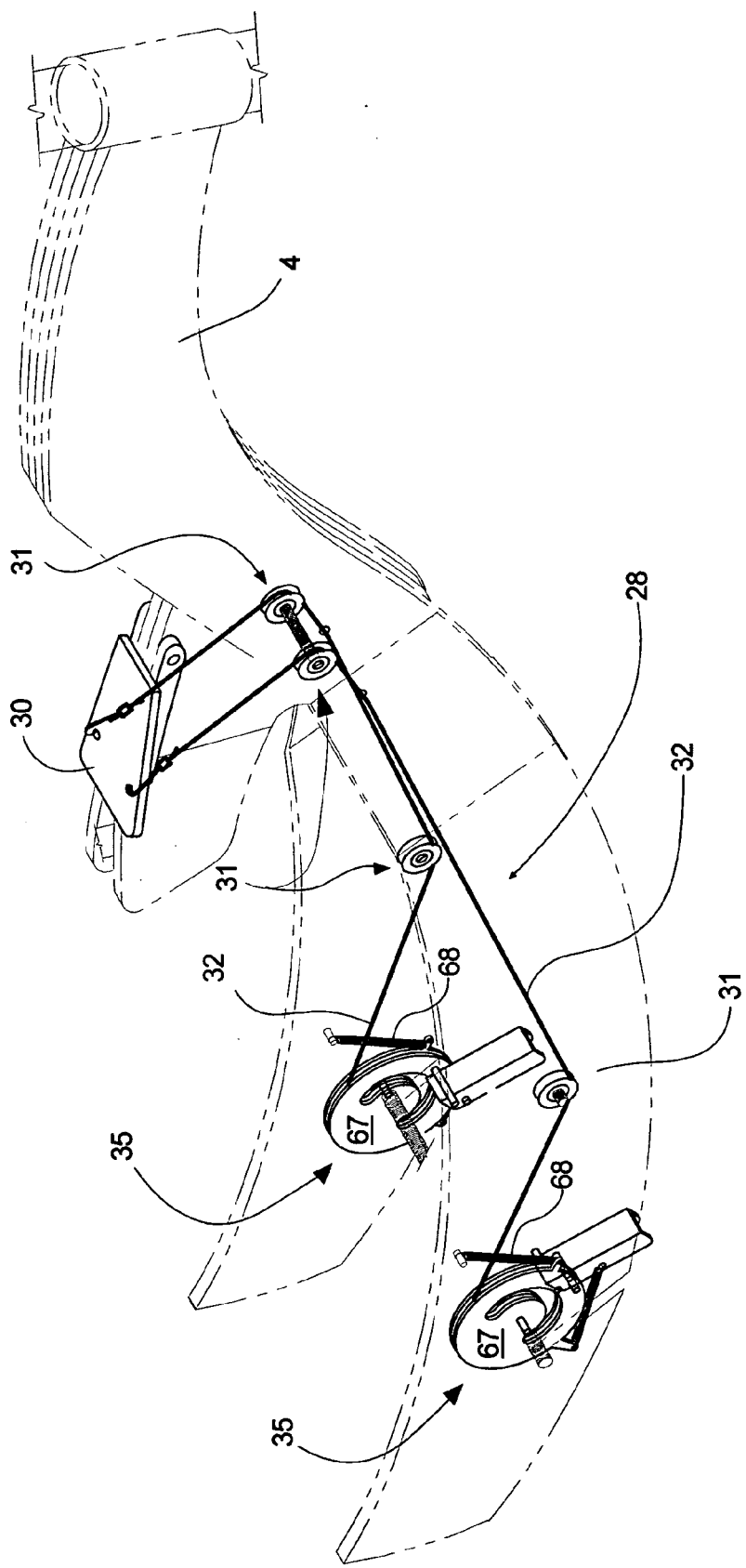
FIG. 21 illustrates the lever enhanced pedaling system's (L.E.P.S.) reverse system 28 relative to the frame 4 of the bicycle.
Figure 22:
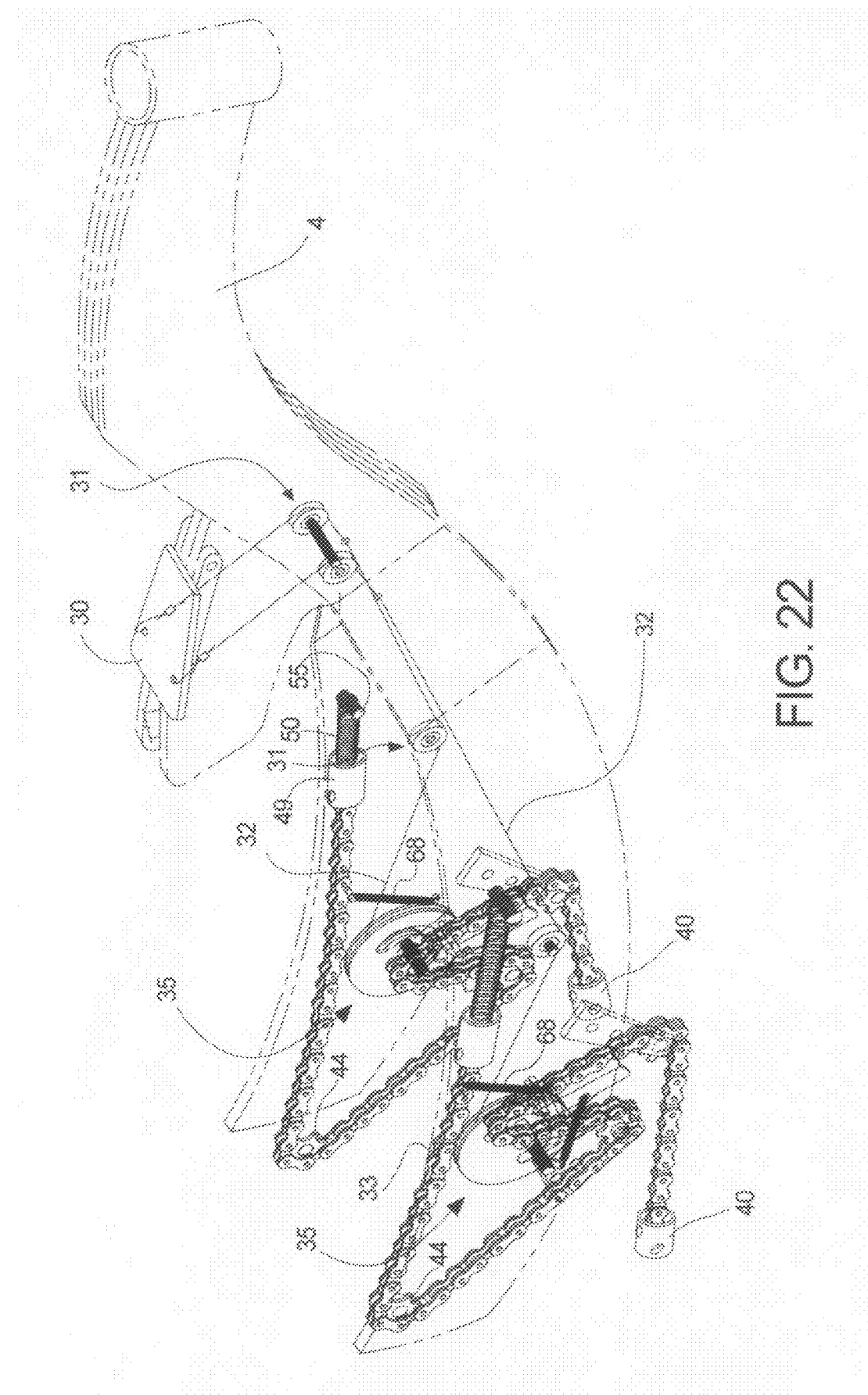
FIG. 22 illustrates how the reverse system 28 interacts with the transmission systems 33 of each lever machine.
Figure 23:
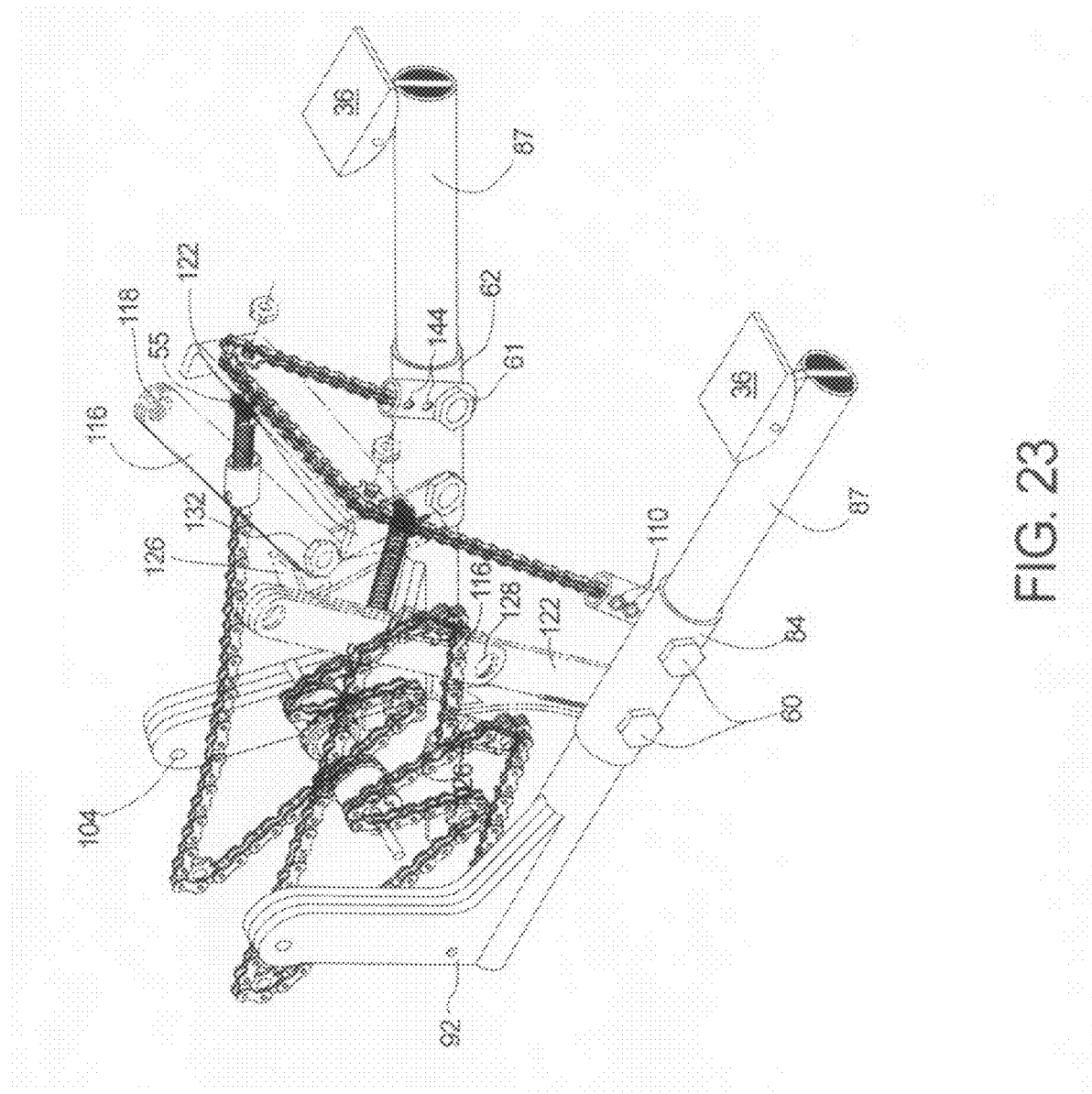
FIG. 23 illustrates an isometric view of how the transmission systems 33, lever propulsion systems (14 and 15), suspension systems 53, repositioning system and hub assembly interacts with each other.

The reverse system FIG. 21 is composed of two steel cables 32, wherein each is operative on its member side of the frame 4 and connected to its member reverse disk 67. Each cable 32 is routed by its member group of pulley wheels 31 towards its member reverse disk 67 into the groove of its member reverse disk 67 (FIG. 21). Each reverse machine 35 is an assembly of a disk 67, its axle, a pivotal beam 65 fastened to its inner surface while being held down with tension by an extension spring 66 (FIG. 6). The spring 66 holds the upper end of the metallic beam 65 against a pin fastened to the inner surface of the disk 67. However, when the reverse lever 30 is pulled upward, the reverse cables 32 should rotate each disk 67 which should cause the inner walls of the beam 65 to contain the transmission chain 33 while its perpendicular portion or ceiling pushes the chain 33 in a circular motion around the extended sprocket 146 to finally lift the chain 33 off of the sprocket for the purpose of allowing the bicycle to be moved in reverse. The second member spring 68 (FIG. 6) of the reverse disk 67 causes the reverse disk 67 to be returned to its former position after the reverse lever 30 is released.

I claim:

1. A lever propelled bicycle, having a frame supported by a front wheel and rear wheel, said rear wheel having a rear wheel axle, wherein said frame extends beyond said rear wheel axle, wherein the improvement comprises:

A right and left propulsion lever for lever pedaling said bicycle, each said lever pivotally connected to a left side and a right side of said frame, wherein each lever is configured in an approximate "L" shape, wherein a shorter side of each said "L" shape lever comprises a vertical portion positioned in an approximate vertical position, wherein a fulcrum of each said lever is at an end portion of each said shorter side of said levers, opposite from a corner of each "L" shape lever, wherein each said end portion is pivotally connected to said frame, wherein said shorter side of each said lever reciprocally swine behind said rear wheel axle of the rear wheel, while having separate loads firstly connected to the vertical portion of each lever, wherein each load consist of a separate linear transmission means, that are secondly directly connected to a hub assembly of the rear wheel, while the hub assembly consist of two radial members on opposite sides of the rear wheel's hub assembly, with the ability of said radial members to rotate freely from the hub rigidly attached to the rear wheel when rotated backwards to enable engagement with said radial member to be repositioned away from said radial members for forward engagement and operatively couple with the rear wheel hub assembly when rotated forward to move and propel the bicycle forward when said separate linear transmission means mesh and pull an outer surface of separate radial members in a rotational motion, while the separate linear transmission means are being pulled reciprocally in a rearward arc motion by each said approximate vertical portion of said levers.

2. The lever propelled bicycle as defined in claim 1, wherein said right and left levers have an approximate "L" shape or form, with the shorter side approximately in the vertical position and the longer side approximately in the horizontal position, when either lever is at a lowest rotated position.

3. The lever propelled bicycle as defined in claim 1 wherein a means of enabling right and left levers to swing in a reciprocal motion is comprised of a high strength chain having a right end that is connected to the right lever and a left end that is connected to the left lever, and a chain portion between these connections is pulled over at least one mounted sprocket, allowing the lever being pushed down to pull the adjacent lever up.

4. The lever propelled bicycle as defined in claim 1 wherein a means of preventing the levers from hitting the ground while the bicycle is being pedaled is composed of a right and left pivotal assembly of metal arms connected to separate member levers, that can bend in one direction while arms are suspended from the frame of the bike.

5. The lever propelled bicycle as defined in claim 1 where in there is a reverse lever which allows each said transmission means to be simultaneously lifted off of a force being applied on each propulsion lever and a pedal associated with each said lever which is an applied downward pressure that is centralized with a rear structure of the frame, wherein rear forks of the frame are to be on center with a center of the propulsion levers and pedals, so that the bicycle may be moved in reverse.

6. The lever propelled bicycle as defined in claim 1, wherein each said right and left lever have their own pedal member connected to them with pivotal ability just above the end portion of each lever.

7. The lever propelled bicycle as defined in claim 1 wherein said lever propelled bicycle has a braking system for stopping front and rear wheels.

8. The lever propelled bicycle as defined in claim 1 wherein the bicycle has a reverse mechanism to allow the bicycle to be moved in a backwards direction.

9. The lever propelled bicycle as defined in claim 1 wherein said right and left lever systems have a principle assembly and structure configuration allowing a leading end of said linear transmission means, for maintaining the straight downward motion of each lever and for preventing undesired flexing of the lever or frame while the bicycle is being pedaled.

* * * * *